US009530427B2

(12) United States Patent
Järvinen

(10) Patent No.: US 9,530,427 B2
(45) Date of Patent: Dec. 27, 2016

(54) SPEECH PROCESSING

(71) Applicant: Nokia Technologies Oy, Espoo (FI)

(72) Inventor: Kari Juhani Järvinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 14/507,290

(22) Filed: Oct. 6, 2014

(65) Prior Publication Data

US 2015/0106088 A1 Apr. 16, 2015

(30) Foreign Application Priority Data

Oct. 10, 2013 (GB) .................................. 1317910.6

(51) Int. Cl.

| | |
|---|---|
| ***G10L 15/00*** | (2013.01) |
| ***G10L 15/20*** | (2006.01) |
| ***G10L 21/0208*** | (2013.01) |
| *G10L 21/0364* | (2013.01) |

(52) U.S. Cl.

CPC .. *G10L 21/0208* (2013.01); *G10L 2021/02087* (2013.01); *G10L 2021/03646* (2013.01)

(58) Field of Classification Search

None

See application file for complete search history.

(56) References Cited

U.S. PATENT DOCUMENTS

| | | | | |
|---|---|---|---|---|
| 4,720,802 A * | 1/1988 | Damoulakis | G10L 15/20 | 704/233 |
| 6,522,746 B1 * | 2/2003 | Marchok | G10L 15/30 | 379/201.01 |
| 8,615,394 B1 * | 12/2013 | Avendano | G10L 25/18 | 704/219 |
| 8,818,800 B2 * | 8/2014 | Fallat | G10L 21/02 | 381/94.1 |

(Continued)

FOREIGN PATENT DOCUMENTS

| | | |
|---|---|---|
| EP | 1926085 A1 | 5/2008 |
| WO | 2008/075305 A1 | 6/2008 |

OTHER PUBLICATIONS

Extended European Search Report received for corresponding European Patent Application No. 14186727.5, dated Feb. 25, 2015, 4 pages.

(Continued)

*Primary Examiner* — Marcus T Riley

(74) *Attorney, Agent, or Firm* — Alston & Bird LLP

(57) ABSTRACT

A technique for enhancing speech signal captured in a noisy environment is provided. According an example embodiment, the technique comprises obtaining a current time frame of a noise-suppressed voice signal, derived on basis of a current time frame of a source audio signal comprising a source voice signal, detecting input voice characteristics for the current time frame of noise-suppressed voice signal, obtaining reference voice characteristics for said current time frame, said reference voice characteristics being (Continued)

descriptive of the source voice signal in noise-free or low-noise environment, and creating a current time frame of a modified voice signal by modifying said current time frame of the noise-suppressed voice signal in response to a difference between the detected input voice characteristic and the reference voice characteristics exceeding a predetermined threshold.

25 Claims, 10 Drawing Sheets

(56) References Cited

U.S. PATENT DOCUMENTS

| | | | | |
|---|---|---|---|---|
| 2005/0102134 | A1* | 5/2005 | Manabe | G06F 3/015 704/207 |
| 2006/0020451 | A1 | 1/2006 | Kushner et al. | |
| 2012/0197636 | A1* | 8/2012 | Benesty | G10L 21/0232 704/226 |
| 2013/0282373 | A1* | 10/2013 | Visser | G10L 21/0208 704/233 |
| 2015/0162014 | A1* | 6/2015 | Zhang | G10L 19/02 704/206 |

OTHER PUBLICATIONS

Davis, "Noise Reduction in Speech Applications", Electrical Engineering & Applied Signal Processing Series, CRC Press, Apr. 18, 2002, 397 Pages.

Search Report received for corresponding United Kingdom Patent Application No. 1317910.6, dated Apr. 11, 2014, 3 pages.

* cited by examiner

SPEECH PROCESSING

TECHNICAL FIELD

The example and non-limiting embodiments of the present invention relate to processing of speech signals. In particular, at least some example embodiments relate to a method, to an apparatus and/or to a computer program for processing speech signals captured in noisy environments.

BACKGROUND

When a person speaks in presence of background noise he or she, in many cases unconsciously, adjusts the way he/she is speaking due to the background noise. The adjustment most notably comprises adjusting of voice loudness, but also adjustment of intonation, speaking pace and/or the spectral content etc. may be observed as a result of the speaker trying to adapt his/her voice to be heard better in presence of the background noise. This adjustment or adaptation is based on the auditory feedback from his/her own voice and the background noise—and interaction of the two. Such an adjustment of voice by the speaker may be referred to as a secondary impact of the background noise.

Many voice capturing arrangements apply noise suppression in order to remove/cancel or at least substantially reduce the background noise in the captured signal. However, while noise suppression is applied, the resulting speech from which the noise is removed or reduces still remains "adjusted" to the environmental background noise. This may make the resulting speech to sound unnatural, annoying and/or even disturbing once the background noise has been removed or reduced, possibly even reducing the intelligibility of the speech. The impact may be especially disturbing for the listener when the characteristics of background noise change rapidly during talking e.g. when during a phone call the far-end speaker raises his/her voice loudness temporarily due to environmental noise, e.g. due to traffic noise caused by a car passing by. Typically, the better the noise suppression is the more noticeable and disturbing this effect may be. Moreover, with possible upcoming advances in noise suppression techniques this issue can be expected to become even more prominent.

Enhancement of a speech signal in the presence of background noise is widely researched topic, having resulted in techniques such as noise cancelling, adaptive equalization, multi-microphone systems etc. aiming to either reduce the background noise in the captured signal or to improve the actual capture so that it becomes less sensitive to background noise. However, such speech enhancement techniques fail to address the above-mentioned issue of the speaker adapting his/her voice in presence of background noise.

SUMMARY

According to an example embodiment, an apparatus is provided, the apparatus comprising at least one processor and at least one memory including computer program code for one or more programs, the at least one memory and the computer program code configured to, with the at least one processor, cause the apparatus at least to obtain a current time frame of a noise-suppressed voice signal, derived on basis of a current time frame of a source audio signal comprising a source voice signal, to detect input voice characteristics for the current time frame of noise-suppressed voice signal, to obtain reference voice characteristics for said current time frame, said reference voice characteristics being descriptive of the source voice signal in noise-free or low-noise environment, and to create a current time frame of a modified voice signal by modifying said current time frame of the noise-suppressed voice signal in response to a difference between the detected input voice characteristic and the reference voice characteristics exceeding a predetermined threshold.

According to another example embodiment, a further apparatus is provided, the apparatus comprising means for means for obtaining a current time frame of a noise-suppressed voice signal, derived on basis of a current time frame of a source audio signal comprising a source voice signal, means for detecting input voice characteristics for the current time frame of noise-suppressed voice signal, means for obtaining reference voice characteristics for said current time frame, said reference voice characteristics being descriptive of the source voice signal in noise-free or low-noise environment, and means for creating a current time frame of a modified voice signal by modifying said current time frame of the noise-suppressed voice signal in response to a difference between the detected input voice characteristic and the reference voice characteristics exceeding a predetermined threshold.

According to another example embodiment, a method is provided, the method comprising obtaining a current time frame of a noise-suppressed voice signal, derived on basis of a current time frame of a source audio signal comprising a source voice signal, detecting input voice characteristics for the current time frame of noise-suppressed voice signal, obtaining reference voice characteristics for said current time frame, said reference voice characteristics being descriptive of the source voice signal in noise-free or low-noise environment, and creating a current time frame of a modified voice signal by modifying said current time frame of the noise-suppressed voice signal in response to a difference between the detected input voice characteristic and the reference voice characteristics exceeding a predetermined threshold.

According to another example embodiment, a computer program is provided, the computer program including one or more sequences of one or more instructions which, when executed by one or more processors, cause an apparatus at least to obtain a current time frame of a noise-suppressed voice signal, derived on basis of a current time frame of a source audio signal comprising a source voice signal, to detect input voice characteristics for the current time frame of noise-suppressed voice signal, to obtain reference voice characteristics for said current time frame, said reference voice characteristics being descriptive of the source voice signal in noise-free or low-noise environment, and to create a current time frame of a modified voice signal by modifying said current time frame of the noise-suppressed voice signal in response to a difference between the detected input voice characteristic and the reference voice characteristics exceeding a predetermined threshold.

The computer program referred to above may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to the fifth aspect of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

Throughout this text, the terms voice and speech are used interchangeably. Similarly, the terms noise suppression, noise reduction and noise removal are used interchangeably throughout this text.

BRIEF DESCRIPTION OF FIGURES

The embodiments of the invention are illustrated by way of example, and not by way of limitation, in the figures of the accompanying drawings.

DESCRIPTION OF SOME EMBODIMENTS

Figure 1:
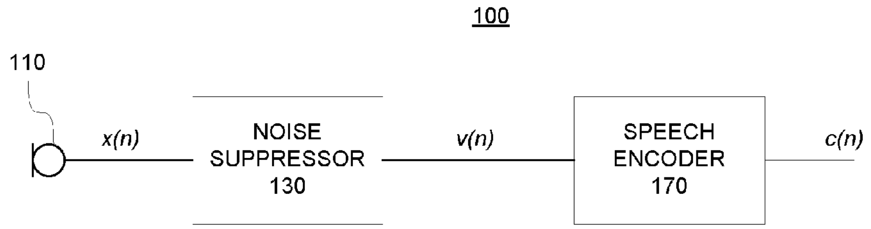
FIG. 1 schematically illustrates some components of a speech processing arrangement.

FIG. 1 schematically illustrates some components of a speech processing arrangement 100, which may be employed e.g. as part of a voice recording arrangement or as part of a voice communication arrangement. The speech processing arrangement 100 may be provided in an electronic device (or apparatus), such as a mobile communication device, e.g. a mobile phone or a smartphone, a voice recording device, a music player or a media player, a personal digital assistant (PDA), a tablet computer, a laptop computer, a desktop computer, a digital camera or video camera provided with voice capturing functionality, etc.

The arrangement 100 comprises a microphone arrangement 110 for capturing audio signal(s) x(n), comprising e.g. a single microphone or a microphone array. The captured audio signal x(n) typically represents the voice uttered by a speaker corrupted by environmental noises, generally referred to as background noise(s). Hence, the captured audio signal x(n) can be, conceptually, considered as a sum of a voice signal $\hat{v}(n)$ representing the utterance by the speaker and the background noise signal n(n) representing the background noise component, i.e. $x(n)=\hat{v}(n)+n(n)$. The voice signal $\hat{v}(n)$ may also be referred to as source voice signal.

The arrangement 100 further comprises a noise suppressor 130 for removing or reducing the amount of the background noise in the captured audio signal x(n). Consequently, the noise suppressor 130 is arranged to derive a noise-suppressed voice signal v(n) on basis of the captured audio signal x(n) by aiming to remove the background noise signal n(n) therefrom. Noise suppression is, however, a non-trivial task and in a real-life scenario perfect cancellation of the noise signal n(n) is typically not possible. Therefore, the noise-suppressed voice signal v(n) is an approximation of the voice signal $\hat{v}(n)$ uttered by the speaker, from which the background noise component is suppressed to extent possible. A number of noise suppression techniques are known in the art.

The arrangement 100 further comprises a speech encoder 170 for compressing the noise-suppressed voice signal v(n) into encoded voice signal c(n) to produce a low bit-rate representation of the voice signal v(n). Generating the encoded voice signal c(n) facilitates transmission of the voice signal v(n) over a transmission channel and/or storage of the voice signal v(n) in storage medium in a resource-saving manner. However, the arrangement 100 is usable also without the speech encoder 170, in which case the noise-suppressed voice signal v(n) may be provided for transmission and/or for storage without compression. A number of speech compression techniques are known in the art.

The arrangement 100 illustrates some components that are relevant for description of the present invention. The electronic device (or apparatus) hosting the arrangement 100 may, however, comprise a number of further components for processing the captured audio signal x(n), the noise-suppressed voice signal v(n) and/or the encoded voice signal c(n). Such additional components typically include an analog-to-digital (A/D) converter for converting the captured audio signal into a digital form. Hence, the captured audio signal x(n) is provided to noise suppressor 130 and the noise-suppressed voice signal v(n) is provided from the noise suppressor 130 as a digital signal. Further examples of additional components include an echo canceller for removing possible acoustic echo caused in the electronic device hosting the arrangement 100 e.g. from the captured audio signal x(n) or the noise-suppressed voice signal v(n) and an audio equalizer for modifying the frequency characteristics of the captured audio signal x(n) (e.g. to compensate for the known characteristics of the microphone arrangement 110 and/or to provide a captured audio signal of desired frequency characteristics).

The captured audio signal captured audio signal x(n) and the noise-suppressed voice signal v(n) are typically processed in short temporal segments, referred to as frames or time frames. Temporal duration of the frame is typically fixed to a predetermined value, e.g. to a suitable value in the range from 20 to 1000 milliseconds (ms). However, the frame duration does not necessarily have to be a fixed one but the duration may be varied over time. The frames may be consecutive (i.e. non-overlapping) in time, or there may overlap between temporally adjacent frames. The noise suppressor 130 and the speech encoder 170 may be arranged to provide real-time processing of the respective voice signal to enable application of the arrangement 100 e.g. for voice communication. Alternatively, the noise suppressor 130 and/or the speech encoder 170 may be arranged to provide off-line processing of the respective voice signals e.g. for a voice recording application.

Figure 2:
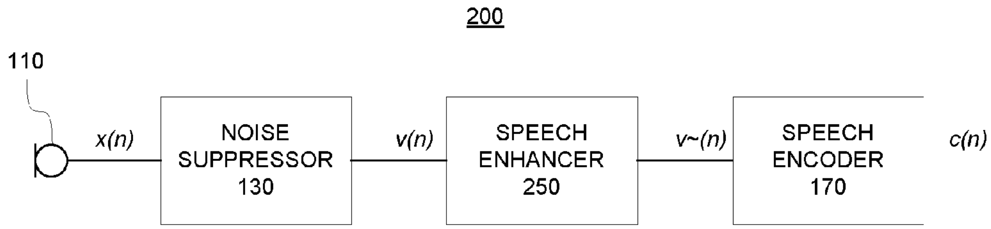
FIG. 2 schematically illustrates some components of a speech processing arrangement according to an example embodiment.

FIG. 2 schematically illustrates some components of a speech processing arrangement 200 according to an embodiment of the present invention. Like the arrangement 100, also the arrangement 200 may serve as part of a voice recording arrangement or as part of a voice communication arrangement. The microphone arrangement 110, the noise suppressor 130 and the (possible) speech encoder 170 of the arrangement 200 correspond to those described in context of the arrangement 100.

The arrangement 200 further comprises a speech enhancer 250 for naturalization of the noise-suppressed voice signal v(n). The speech enhancer 250 obtains the noise-suppressed voice signal v(n) and creates or derives a corresponding modified voice signal $\tilde{v}(n)$ based at least in part on the noise-suppressed voice signal v(n) on basis of predetermined set of processing rules (i.e. a processing algorithm). A purpose of the speech enhancer 250 is to create the modified voice signal $\tilde{v}(n)$ in which the effect(s) of the speaker adjusting his/her voice to account for background noise conditions are compensated for, thereby providing a more naturally-sounding voice signal for speech compression, storage and/or other processing. Further details of an exemplifying speech enhancer 250 will be described later in this text. Hence, in comparison to the arrangement 100, it is the modified voice signal $\tilde{v}(n)$ (instead of the noise-suppressed voice signal v(n)) that is provided for transmission/storage or for further processing e.g. by the speech encoder 170.

The noise suppressor 130 may be arranged to extract one or more parameters that are descriptive of characteristics of the background noise signal n(n) in the captured audio signal x(n) and to provide one or more of these parameters to the speech enhancer 250. Conversely, the speech enhancer 250 may be configured to obtain one or more parameters that are descriptive of characteristics of the background noise signal n(n). Such parameters may include, for example, one or more parameters descriptive of the power or average magnitude of the background noise signal n(n), one or more parameters descriptive of the spectral shape and/or spectral magnitude of the background noise signal n(n), etc.

Although illustrated as a dedicated component in FIG. 2, the speech enhancer 250 may be provided jointly with another component of the arrangement 200 or the electronic device (or apparatus) hosting the arrangement 200. As particular examples, the speech enhancer 250 may be provided as part of the noise suppressor 130 or as part of the speech encoder 170.

As an example, the speech enhancer 250 may be always enabled, thereby arranged to process the noise-suppressed voice signal v(n) regardless of the user's selection. As another example, the speech enhancer 250 may be enabled or disabled in accordance with the user's selection. As a further example, the speech enhancer 250 may be enabled or disabled in accordance with a request from a remote user. In the latter example, if the speech processing arrangement 200 comprising the speech enhancer 250 is applied for voice communication, the request may be provided e.g. by the user of the remote speech processing arrangement.

Figure 3A:
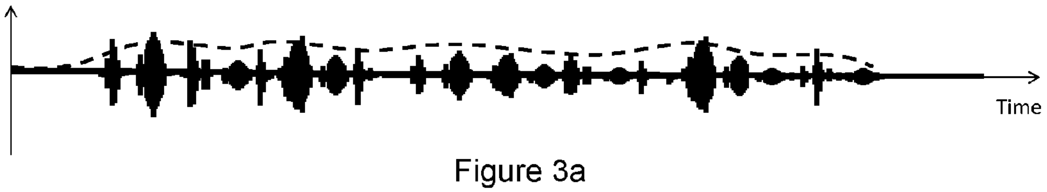
FIGS. 3*a* to 3*f* provide a conceptual illustration of some aspects of time-domain impact in accordance with some example embodiments.

The illustrations of FIGS. **3*a* to 3*f* provide a conceptual example for illustrating an impact of the speech naturalization in time domain. FIG. 3*a* illustrates a waveform of an exemplifying voice signal $\hat{v}(n)$, which would also constitute the captured audio signal x(n) in case no background noise is present. FIG. 3*a*** further illustrates the estimated average magnitude of the voice signal $\hat{v}(n)$, shown as a dashed curve. The average magnitude may be estimated e.g. as a root mean squared (RMS) value e.g. at 50 to 500 ms intervals by using a (sliding) window covering e.g. a 500 to 3000 ms segment of past voice signal $\hat{v}(n)$. In particular, the segment of past voice signal $\hat{v}(n)$ may cover one or more most recent segments of active speech in the voice signal $\hat{v}(n)$. Herein, the term active speech refers to periods of the voice signal $\hat{v}(n)$ that represent an utterance by the speaker while, in contrast, silent periods between the utterances may be referred to as non-active periods. Voice Activity Detection (VAD) techniques for detecting periods of active speech in a voice signal are known in the art.

Figure 3B:
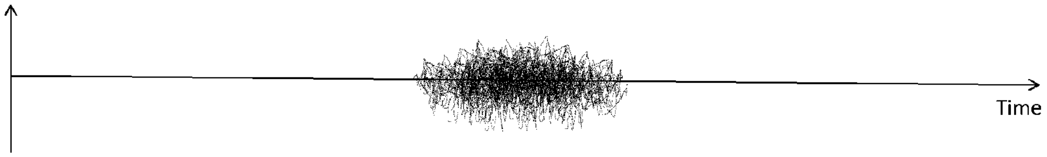
Figure 3C:
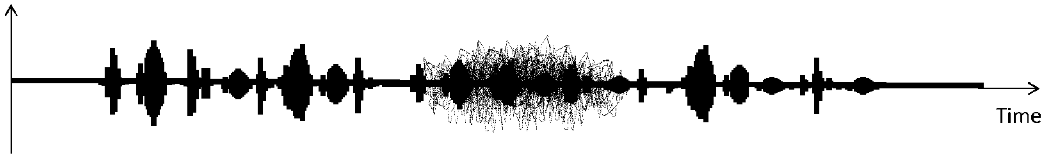

FIG. **3*b* illustrates a waveform of an exemplifying background noise signal n(n) that temporally partially coincides with the voice signal n(n) of FIG. 3*a*, whereas FIG. 3*c* illustrates the combined waveform of the voice and background noise signals of FIGS. 3*a* and 3*b*, constituting a theoretical example of the captured audio signal $x(n)=\hat{v}(n)+n(n)$. However, as described hereinbefore, when a person speaks in an environment where background noise is present, due to the auditory feedback he or she is prone to adjust the way he/she is speaking as a reaction to the background noise, thereby adjusting the loudness of voice signal $\hat{v}(n)$ and possibly also e.g. intonation, speaking pace, and/or the spectral content of the voice signal $\hat{v}(n)$. Consequently, due to the speaker adjusting his/her way of speaking the waveform of the voice signal $\hat{v}(n)$ is likely to look like the one exemplified in FIG. 3*d*. Note that in FIGS. 3*c* and 3*d*** the waveforms of the voice signal $\hat{v}(n)$ and the background noise signal n(n) are shown separately for clarity of illustration, while the captured audio signal x(n) will be the sum of these two signals.

Figure 3D:
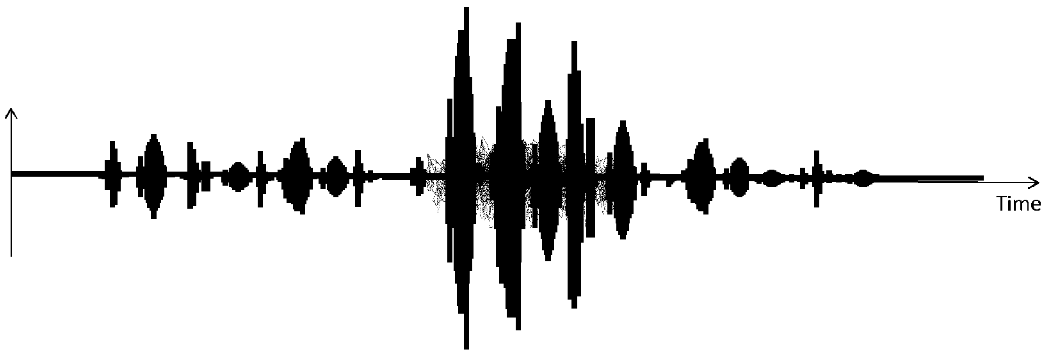
Figure 3E:
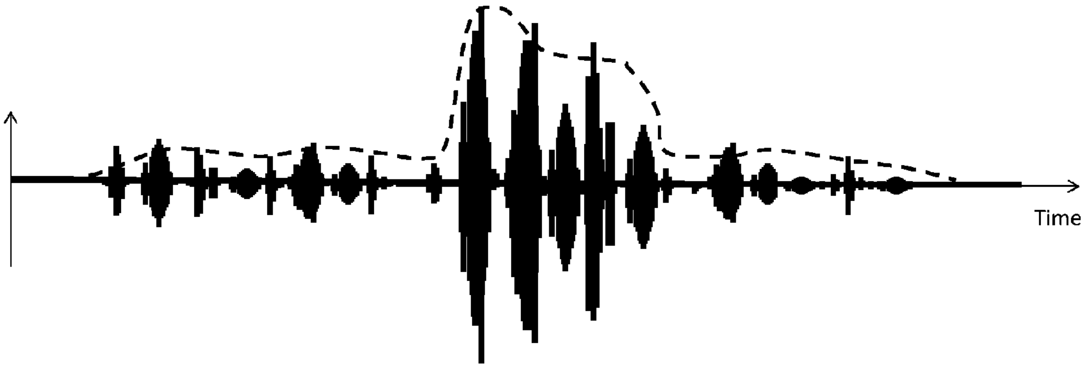

FIG. **3*e* illustrates a waveform of the noise-suppressed voice signal v(n) when the background noise signal n(n) has been removed or at least substantially reduced from the captured audio signal x(n) illustrated in FIG. 3*d*. FIG. 3*e* further shows a dashed curve illustrating the respective estimated average magnitude of the noise-suppressed voice signal v(n). As may be observed in FIG. 3*e*, the average magnitude of the noise-suppressed voice signal v(n) indicates substantially higher level within the time period during which also contribution of the background noise signal n(n) is included in the captured audio signal x(n). In the arrangement 100 the noise-suppressed voice signal v(n) of FIG. 3*e* would be the signal provided for the speech encoder 170** for further processing.

Figure 3F:

FIG. **3*f* illustrates a waveform of the modified voice signal $\tilde{v}(n)$, created in the speech enhancer 250 based at least in part on the noise-suppressed voice signal v(n) as an output of the speech naturalization process. FIG. 3*f* further shows a dashed curve illustrating the respective estimated average magnitude of the modified voice signal $\tilde{v}(n)$. As may be observed in FIG. 3*f*, the average magnitude of the modified voice signal $\tilde{v}(n)$ indicates essentially constant signal level throughout the waveform, also within the period during which the contribution of the background noise signal n(n) is included in the captured audio signal x(n). In the arrangement 200 the modified voice signal $\tilde{v}(n)$ of FIG. 3*f* would be the signal provided for the speech encoder 170** for further processing. Due to cancellation of the increase in magnitude that is likely to sound unnatural in the noise-suppressed voice signal v(n) during the period of background noise signal n(n), a substantial improvement in subjective voice quality, naturalness and/or intelligibility can be expected when using the modified voice signal $\tilde{v}(n)$ instead as basis for speech compression and/or any other further processing.

The speaker adjusting his/her voice to account for variations in the background noise typically enables his/her voice to be heard even in relatively high levels of background noise. Furthermore, the increased magnitude of the speaker's voice facilitates the noise suppressor 130 to (more) efficiently separate the voice signal v(n) or an approximation thereof (i.e. the noise-suppressed voice signal $\tilde{v}(n)$) from the captured audio signal x(n) that also includes the background noise signal n(n) at a relatively high level. Hence, although the speaker adjusting his/her voice in response to variations in the background noise may result in an effect that makes the noise-suppressed voice signal v(n) to sound unnatural or distorted, at the same time it contributes to efficiently preserving the voice signal v(n) contribution of the captured audio signal x(n) and it is also useful in facilitating high-quality operation of the noise suppressor 130 and the speech processing arrangement 100, 200 in general.

Figure 4:
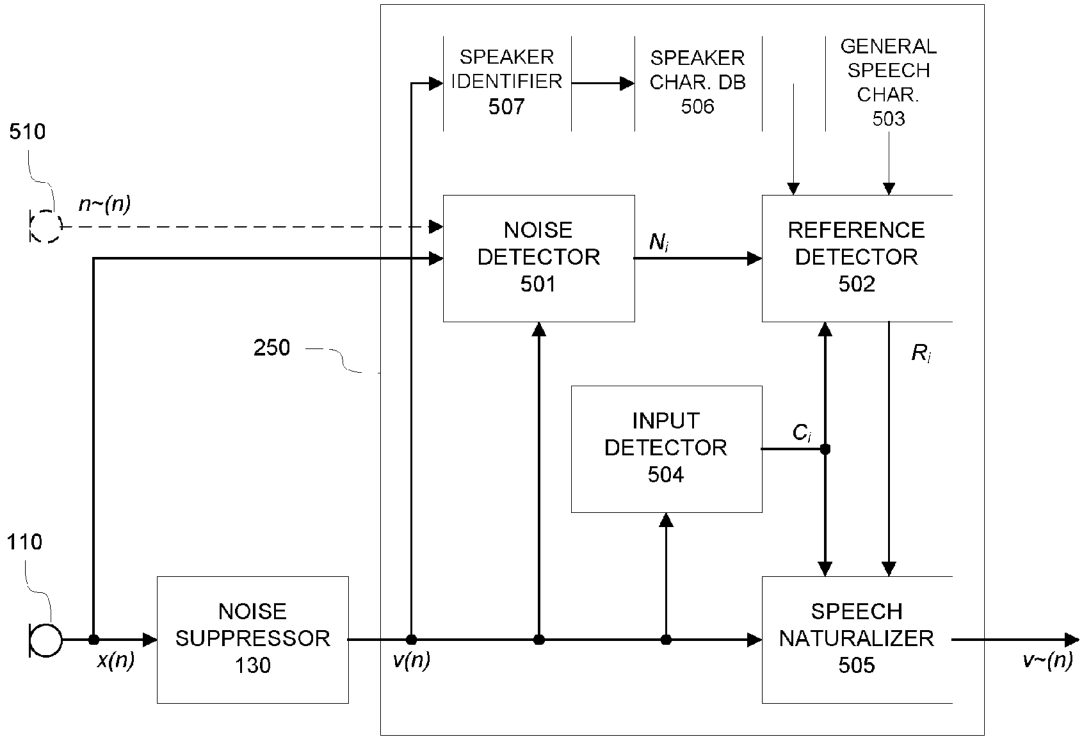
FIG. 4 schematically illustrates some components of a speech enhancer according to an example embodiment.

FIG. 4 schematically illustrates some components of the speech enhancer 250 in form of a block diagram. As already illustrated in FIG. 2, the speech enhancer 250 receives the noise-suppressed voice signal v(n) as an input and provides the modified voice signal $\tilde{v}(n)$ as an output. The speech enhancer 250 comprises a reference voice detector 502 for detection of reference voice characteristics $R_i$, an input voice detector 504 for detection of input voice characteristics $C_i$ and a speech naturalizer 505 for creating the modified speech signal $\tilde{v}(n)$. The speech enhancer 250 may comprise further processing portions or processing blocks, such as a noise detector 501 for detection of noise characteristics $N_i$. Illustrative examples of these components of the speech enhancer 250 are described in more detail in the following.

In general, the speech enhancer 250 is arranged to process the noise-suppressed voice signal as a sequence of frames, i.e. frame by frame. As described hereinbefore, a frame of the noise-suppressed voice signal v(n) is derived in the noise suppressor 130 on basis of the voice signal $\hat{v}(n)$, e.g. on basis of the corresponding frame of the voice signal $\hat{v}(n)$. For clarity and brevity of description, in the following the operation of the speech enhancer 250 is described for a single frame. The speech enhancer 250 is arranged to repeat the process for frames of the sequence frames.

The speech enhancer 250 is configured to obtain a frame of the noise-suppressed voice signal v(n). This frame may be referred to as a current frame of the noise-suppressed voice signal v(n) or frame t of the noise-suppressed voice-signal and it may be denoted as frame $v_t(n)$. The frame $v_t(n)$ is provided for the input voice detector 504 for detection of the input voice characteristics $C_i$ for the frame t and for the speech naturalizer 505 for creation of the respective frame of the modified speech signal $\tilde{v}_t(n)$. The frame $v_t(n)$ may be further provided for the noise detector 501 to assist the process of background noise characterization.

The input voice detector 504 may be arranged to detect the input voice characteristics $C_i$ for the frame $v_t(n)$ on basis of the noise-suppressed voice signal v(n). Since the input voice characteristics $C_i$ are derived on basis of the noise-suppressed voice signal v(n) thereby being representative of 'clean' voice, the input voice characteristics may also be referred to as clean voice characteristics. The input voice characteristics may include characteristics of a single type or characteristics of two or several types. As an example, the voice characteristics may include one or more of the following: loudness characteristics, pace characteristics, spectral characteristics, intonation characteristics. Examples of different voice characteristics will be described in more detail later in this text.

The input voice detector 504 may be arranged to carry out an analysis of a segment/period of the noise-suppressed voice signal v(n) covering one or more frames representing active speech in order to detect the input voice characteristics $C_{t,i}$ (where t refers to the current frame and i identifies the characteristic) for the frame $v_t(n)$. As an example, the input voice characteristics $C_{t,i}$ may be detected on basis of the frame $v_t(n)$ only. As another example, the input voice characteristics $C_{t,i}$ may be detected on basis of the frame $v_t(n)$ and further on basis of a predetermined number of frames preceding the frame $v_t(n)$ (e.g. frames $v_{t-k1}(n), \ldots v_{t-1}(n)$) and/or a predetermined number of frames following the frame $v_t(n)$ (e.g. frames $v_{t+1}(n), \ldots, v_{t+k2}(n)$). Detecting the input voice characteristics $C_{t,i}$ over a segment of the noise-suppressed voice signal v(n) extending over a number of frames may comprise carrying out the analysis for a single segment of signal covering the respective frames or carrying out the analysis for each frame separately and combining, e.g. averaging, the analysis results obtained for individual frames into the input voice characteristics $C_{t,i}$ representative of the frames included in the analysis. Detecting the input voice characteristics $C_{t,i}$ over a number of frames provides a benefit of avoiding the input voice characteristics $C_{t,i}$ to reflect only characteristics of particular sounds or short-term disturbances instead of overall input voice characteristics of the noise-suppressed voice signal v(n). As an example, the detection of the input voice characteristics $C_{t,i}$ may be carried out for a signal segment covering up to 2-5 seconds of the noise-suppressed voice signal v(n).

The reference voice detector 502 is arranged to obtain the reference voice characteristics $R_{t,i}$ (where t refers to the current frame and i identifies the characteristic) for the frame $v_t(n)$. The reference voice characteristics $R_{t,i}$ are, preferably, descriptive of the voice signal $\hat{v}(n)$ (referred to also as the source voice signal) in a noise-free environment or in a low-noise environment. The reference voice characteristics $R_{t,i}$ typically include similar selection of voice characteristics as the input voice characteristics $C_{t,i}$ (or a limited subset thereof). Since the reference voice characteristics $R_{t,i}$ reflect the desired characteristics for the noise-suppressed speech signal v(n), they may also be referred to as pure voice characteristics.

The reference voice detector 502 is arranged to obtain the noise characteristics $N_i$ from the noise detector 501. The noise characteristics for the current frame, i.e. the frame t, may be denoted as $N_{t,i}$. The noise characteristics $N_{t,i}$ may include a noise indication $L_t$ for indicating whether the frame t of the captured audio signal $x_t(n)$ comprises a significant background noise component or not. In the former case the frame $x_t(n)$ may be referred to as a noisy frame while in the latter case the frame $x_t(n)$ may be referred to as a clean frame. A clean frame may be considered to represent speech in noise-free or low-noise environment, whereas a noisy frame may be considered to represent speech in noisy environment. As an example, the noise indication $L_t$ may comprise a parameter descriptive of the estimated noise level in the frame $x_t(n)$. The noise level may be indicated e.g. as RMS value descriptive of the average magnitude of the noise. Consequently, the reference voice detector 502 may be configured to determine whether the frame $x_t(n)$ is a noisy frame or a clean frame e.g. such that frames for which the indicated noise level is larger than or equal to a predetermined noise threshold are considered as noisy frames while frame for which the indicated noise level is below said noise threshold are considered as clean frames. As another example, the noise indication $L_t$ may be a binary flag that directly indicates whether the frame $x_t(n)$ is a noisy frame or a clean frame.

Obtaining the reference voice characteristics $R_{t,i}$ may comprise, determining whether the input voice characteristic $C_{t,i}$ qualify as the reference voice characteristics $R_{t,i}$. This determination, typically, comprises determining whether the input voice characteristics represent speech in noise-free or low-noise environment. Consequently, the input voice characteristics $C_{t,i}$ may be considered to represent speech in noise-free or low-noise environment, and hence applicable as the reference voice characteristics $R_{t,i}$, in response to the input voice characteristics representing speech in noise-free or low-noise environment. As an example, the input voice characteristics $C_{t,i}$ may be considered to represent speech in noise-free or low-noise environment in response to the frame $x_t(n)$ being indicated as a clean frame. As another example, the input voice characteristics $C_{t,i}$ may be considered to represent speech in noise-free or low-noise environment in response to a predetermined number or a predetermined percentage of frames involved in detection of the input voice characteristics $C_{t,i}$ being indicated as clean frames. As a specific example in this regard, the predetermined number/percentage may require all frames involved in detection of the input voice characteristics $C_{t,i}$ being indicated as clean frames. In contrast, in case the input voice characteristics $C_{t,i}$ are not considered as applicable for the reference voice characteristics $R_{t,i}$, e.g. in response to the input voice characteristics $C_{t,i}$ representing noisy speech (e.g. the input voice characteristics $C_{t,i}$ not representing speech in noise-free or low-noise environment), obtaining the reference voice characteristics $R_{t,i}$ comprises applying the reference voice characteristics $R_{t-1,i}$ obtained for a preceding frame, e.g. the frame $v_{t-1}(n)$, as the reference voice characteristics $R_{t,i}$. The reference voice detector 502 is further configured to store (into a memory) the obtained reference voice characteristics $R_{t,i}$ to make them available in processing of subsequent frame.

In case the input voice characteristics $C_{t,i}$ are considered applicable as reference voice characteristics $R_{t,i}$, the reference voice detector 502 may be further configured to adapt the detected input voice characteristics $C_{t,i}$ on basis of general properties of speech signals in a noise-free environment or in a low-noise environment to derive the reference voice characteristics $R_{t,i}$. In this regard, the reference voice detector 502 may be arranged to apply knowledge of general properties of speech provided in block 503 to adapt the detected input voice characteristics $C_{t,i}$ accordingly. The general properties of speech (block 503) may be provided e.g. as data stored in a memory accessible by the speech enhancer 250, e.g. in a memory provided in the speech enhancer 250.

As an example in this regard, the reference voice detector 502 may be configured to, in case the input voice characteristics $C_{t,i}$ are considered applicable as basis for determining/updating the reference voice characteristics $R_{t,i}$, compute the reference voice characteristics $C_{t,i}$ as a weighted sum of the input voice characteristics and respective 'average' voice characteristics $A_i$ that represent respective voice characteristics in a noise-free or low-noise environment, e.g. as $R_{t,i}=w_1C_{t,i}+w_2A_i$, where $w_1+w_2=1$. The weighting values $w_1$ and $w_2$ may be fixed predetermined values, selected in accordance of the desired extent of the impact of the 'average' voice characteristics $A_i$.

As another example, the voice characteristics in a noise-free or low-noise environment may be represented by the 'average' voice characteristics $A_i$ and respective margins $m_i$ that define the maximum allowable deviation from the respective 'average' voice characteristic $A_i$. In case any of the detected input voice characteristics $C_{t,i}$ differs from the respective 'average' voice characteristic by more than the respective margin $m_i$ (e.g. if $|C_{t,i}-A_i|>m_i$), the input voice characteristics may be disqualified from being applied as the reference voice characteristics $R_{t,i}$ and the reference voice characteristics $R_{t-1,i}$ are applied as the reference voice characteristics $R_{t,i}$ instead.

In case the input voice characteristics $C_{t,i}$ are considered applicable as reference voice characteristics $R_{t,i}$, the reference voice detector 502 may be further configured to adapt the detected input voice characteristics $C_{t,i}$ on basis of general properties of speech signals uttered by the speaker of the voice signal $\hat{v}(n)$ to derive the reference voice characteristics $R_{t,i}$. The personal properties or personal characteristics of speech signals uttered by the speaker of the voice signal $\hat{v}(n)$ may be applied in a manner similar to described for the general properties above. For adaptation on basis of the personal characteristics, predetermined average personal voice characteristics $A_{k,i}$ for the speaker k are applied instead the generic average generic voice characteristics $A_i$.

In this regard, the speech enhancer 250 may comprise speaker identifier 507 arranged to apply a speaker recognition technique known in the art to identify the current speaker on basis of a segment/portion of the noise-suppressed voice signal v(n). Alternatively, the speaker identifier 507 may be arranged to identify the current speaker on basis of a segment/portion of the captured audio signal x(n). The speaker identifier 507 may be further configured to provide identification of the speaker to the speaker identification database 506 arranged to store predetermined personal voice characteristics $A_{k,i}$ for a number of speakers. The speaker identification database 506, in turn, provides the personal voice characteristics $A_{k,i}$ to the reference voice detector 502.

In case the reference voice characteristics $R_{t,i}$ are not (yet) available, the general properties of speech signals in a noise-free environment or in a low-noise environment, the general properties of speech signals uttered by the speaker of the voice signal $\hat{v}(n)$ (if available) or a combination thereof (e.g. a weighted average) may be used as the reference voice characteristics $R_{t,i}$. Such a situation may occur e.g. immediately after initialization or re-initialization (e.g. a reset) of the speech enhancer 250 e.g. in the beginning of a communication session or during a communication session due to an error condition.

The speech naturalizer 505 is configured to create the modified voice signal $\tilde{v}(n)$ on basis of the noise-suppressed voice signal v(n). In particular, the speech naturalizer 505 may be configured to create the frame t of the modified voice signal $\tilde{v}(n)$, denoted as $\tilde{v}_t(n)$ by modifying the frame $v_t(n)$ in response to difference(s) between the input voice characteristic $C_{t,i}$ and the reference characteristics $R_{t,i}$ meeting predetermined criteria. In contrast, in response to said difference failing to meet said criteria, the speech naturalizer 505 may be configured to create the frame $\tilde{v}_t(n)$ as a copy of the frame $v_t(n)$. In case the previous frame of the modified voice signal $\tilde{v}_{t-1}(n)$ was created as a modification of the corresponding noise-suppressed frame $v_{t-1}(n)$, the speech naturalizer 505 may be configured to apply smoothing for the end of the frame $\tilde{v}_{t-1}(n)$ and for the beginning of the frame $\tilde{v}_t(n)$, such as cross-fading between a segment in the end of frame $\tilde{v}_{t-1}(n)$ and a segment of similar length in the beginning of the frame $\tilde{v}_t(n)$, instead of applying a direct copy of the frame in order to minimize the risk of introducing a discontinuation that may be perceived as an audible distortion in the modified voice signal $\tilde{v}(n)$.

Evaluation whether the difference(s) between the input voice characteristic $C_{t,i}$ and the reference characteristics $R_{t,i}$ meets the predetermined criteria may comprise determining respective comparison values $D_{t,i}$ as the difference(s) between the respective input and reference voice characteristics, e.g. as $D_{t,i}=C_{t,i}-R_{t,i}$, and determining whether one or more of the comparison values $D_{t,i}$ exceed a respective predetermined threshold $Th_i$. The modification of the frame $v_t(n)$ may be applied e.g. in response to any of the comparison values $D_{t,i}$ exceeding the respective threshold $Th_i$, in response to a predetermined number of the comparison values $D_{t,i}$ exceeding the respective threshold $Th_i$ or in response to all comparison values $D_{t,i}$ exceeding the respective threshold $Th_i$.

The modification of the frame $v_t(n)$ in order to create the frame $\tilde{v}_t(n)$ may comprise modifying the frame $v_t(n)$ such that the frame $\tilde{v}(n)$ so created exhibits modified voice characteristics $\tilde{C}_{t,i}$ that correspond to the reference voice characteristics $R_{t,i}$. This may involve modification(s) bringing the modified voice characteristics $\tilde{C}_{t,i}$ to be identical to, essentially identical to or approximate the reference voice characteristics $R_{t,i}$. As another example, the modification may comprise modifying the frame $v_t(n)$ such that the frame $\tilde{v}_t(n)$ so created exhibits voice characteristics $\tilde{C}_{t,i}$ that are a weighted sum of the input voice characteristics $R_{t,i}$ and the reference voice characteristics $C_{t,i}$, e.g. $\tilde{C}_{t,i}=w_c*C_{t,i}+w_r*R_{t,i}$ where $w_c$ and $w_r$ denote the weights assigned for the input voice characteristics and the reference voice characteristics, respectively, and where $w_c+w_r=1$ (and preferably also $w_c<w_r$, to give a higher emphasis to the reference voice characteristics).

The noise detector 501 is configured to determine the noise characteristics $N_i$ on basis of the captured audio signal x(n) and/or the noise-suppressed voice signal v(n). In particular, the noise detector 501 may be configured to detect the noise characteristics $N_{t,i}$ for the current frame on basis of the current frame of the captured audio signal $x_t(n)$ and/or the current frame of the noise-suppressed voice signal $v_t(n)$. The noise detection may, additionally, consider a predetermined number of frames (of the respective voice signal) immediately preceding the frame $x_t(n)$ and/or $v_t(n)$ and/or a predetermined number of frames (of the respective signal) immediately following the frame $x_t(n)$ and/or $v_t(n)$.

As pointed out before, the noise characteristics $N_{t,i}$ may include the noise indication $L_{t,n}$ for indicating whether the frame t of the captured audio signal $x_t(n)$ comprises a significant background noise component or not, the noise indication $L_{t,n}$ comprising a parameter descriptive of the estimated noise level in the frame $x_t(n)$. In this regard, the noise detector may determine the difference signal d(n) between the captured audio signal x(n) and the noise-suppressed signal v(n), e.g. as d(n)=x(n)−v(n), for a signal segment/period of interest. The signal segment/period of interest typically comprises the current frame t, possibly together with a predetermined number of frames immediately preceding the current frame and/or a predetermined number of frames immediately following the current frame). The parameter descriptive of the noise level may be derived on basis of the difference signal d(n), e.g. as an RMS value descriptive of the average magnitude of the signal d(n) over the segment/period of interest. As also described hereinbefore, the noise indication $L_{t,n}$ may, as another example, comprise a binary flag that directly indicates whether the frame $x_t(n)$ is a noisy frame or a clean frame. In this regard, the noise detector 501 may be configured to apply the approach described as an example in context of the reference voice detector 502 to determine the binary flag by comparing the determined noise level to the predetermined noise threshold.

As a variation of the above-described approach for detecting the noise on basis of the captured audio signal x(n) and the noise-suppressed signal v(n), the speech enhancer may further receive a noise signal $\hat{n}(n)$ from a microphone arrangement 510 arranged/dedicated to capture a signal that represents only the background noise component. Like the microphone arrangement 110, the microphone arrangement 510 may comprise a single microphone or a microphone array. Consequently, instead of estimating the noise as the difference signal d(n), in this approach the noise detector 501 may be arranged to detect the noise characteristics $N_{t,i}$, e.g. the noise indication $L_{t,n}$, on basis of the noise signal $\hat{n}(n)$.

Instead of providing the noise detector 501 as a component of the speech enhancer 250, the noise detector 501 may be provided outside the speech enhancer 250, e.g. as part of the noise suppressor 130 or as a dedicated processing block/portion arranged to derive the noise characteristics $N_i$ on basis of the captured audio signal x(n) and/or the noise-suppressed voice signal v(n).

Figure 5:
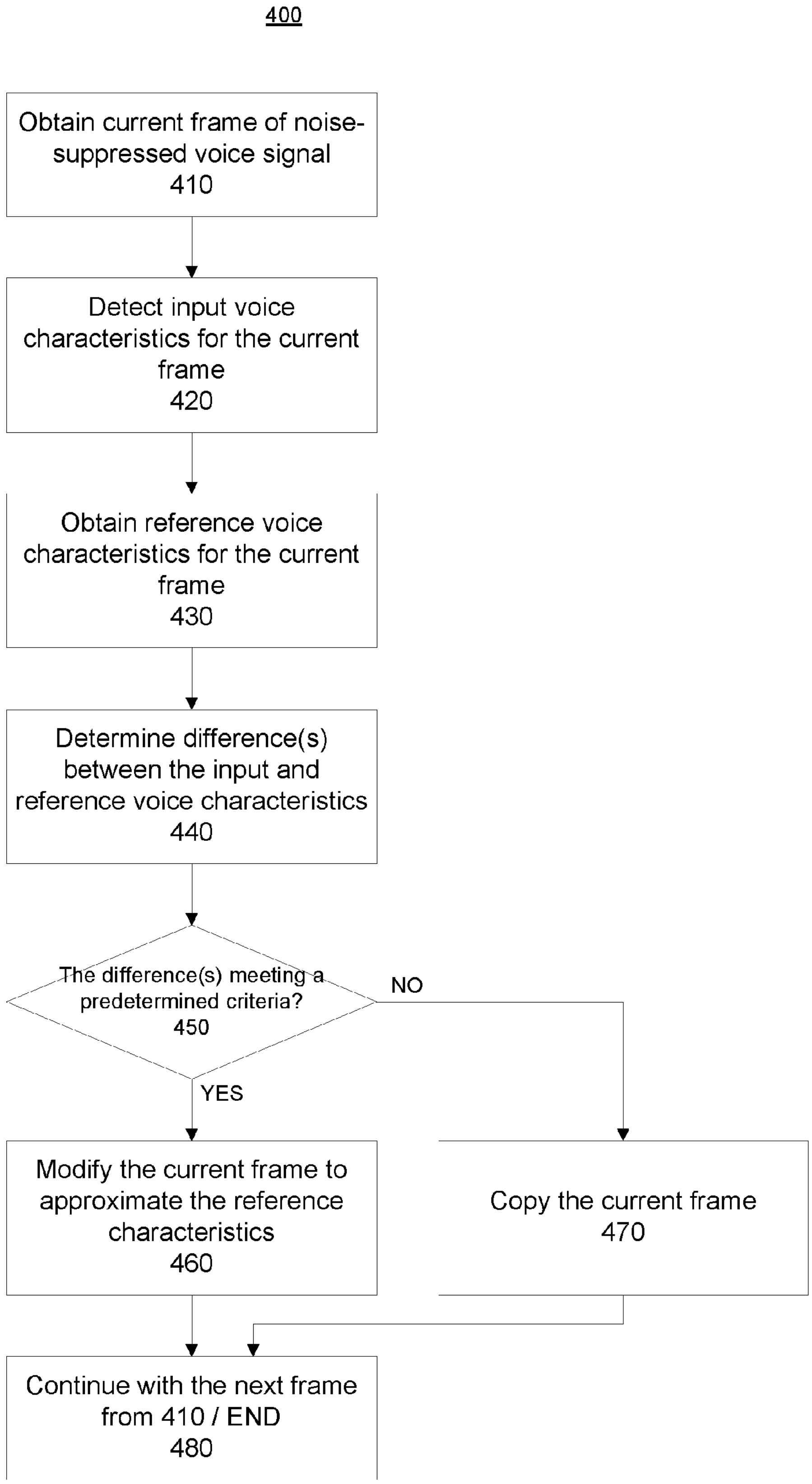
FIG. 5 illustrates a method according to an example embodiment.

FIG. 5 illustrates a flowchart describing a method 400 for processing a voice signal in the framework of the arrangement 200. The method 400 describes the speech naturalization process at a high level. In block 410, the current frame of noise-suppressed voice signal v(n), i.e. frame $v_t(n)$ is obtained. In block 420, the input voice characteristics $C_{t,i}$ for the frame $v_t(n)$ are detected, as described hereinbefore in context of the input voice detector 504. In block 430, the reference voice characteristics $R_{t,i}$ for the current frame of the noise-suppressed voice signal $v_t(n)$ are obtained, e.g. as described hereinbefore in context of the reference voice detector 502.

In block 440, the difference(s) between the input voice characteristics $C_{t,i}$ and the corresponding reference voice characteristics $R_{t,i}$ are determined, and in block 450 a determination whether the determined difference(s) meet the predetermined criteria is carried out, as described hereinbefore in context of the speech naturalizer 505. In response to the difference(s) meeting the criteria, the frame of modified voice signal $\tilde{v}_t(n)$ is created by modifying the respective frame of the noise-suppressed voice signal $v_t(n)$ e.g. to exhibit modified voice characteristics $\tilde{C}_{t,i}$ that are similar to or approximate the reference voice characteristics $R_{t,i}$, as described hereinbefore in context of the speech naturalizer 505 and as indicated in block 460. In contrast, in response to the difference(s) failing to meet the predetermined criteria, the frame of modified voice signal $\tilde{v}_t(n)$ is created e.g. as a copy of the respective frame of the noise-suppressed voice signal $v_t(n)$, as described hereinbefore in context of the speech naturalizer 505 and as indicated in block 470. From block 460 or 470 the method 400 proceeds to obtain the next frame $v_{t+1}(n)$ of the noise-suppressed voice signal (in block 410) and the process from block 410 to 450 or 460 is repeated as long as further frames of the noise-suppressed voice signal are available, as indicated in block 480.

As briefly referred to above, the voice characteristics applied as the input voice characteristics $C_{t,i}$, the reference voice characteristics $R_{t,i}$ and the modified voice characteristics $\tilde{C}_{t,i}$ may include one or more parameters descriptive of voice characteristics. These parameters may include parameters descriptive of voice characteristics of a single type or voice characteristics of different types.

The voice characteristics may include one or more parameters descriptive of loudness or energy level of the respective voice signal, typically averaged over a signal segment/period of a desired length. The noise characteristics $N_{t,i}$ may comprise one or more respective parameters descriptive of the background noise signal n(n).

The voice characteristics may include one or more parameters descriptive of the spectral magnitude or the spectral shape of the respective voice signal. The spectral shape/magnitude may be provided e.g. as a set of spectral bins, each indicating the spectral magnitude of the respective frequency region. The noise characteristics $N_{t,i}$ may comprise one or more respective parameters descriptive of the background noise signal n(n).

The voice characteristics may include one or more parameters descriptive of the pace or rhythm of the speech in the respective voice signal. Such parameters may, for example, provide an indication of the minimum, maximum and/or average duration of pauses within the speech. These indications may concern e.g. indications of the pauses between words or pauses between phonemes in the respective voice signal.

The voice characteristics may include one or more parameters descriptive of the pitch of voice of the speaker in the respective voice signal.

Table 1 provides some examples of types of voice characteristics, (typically unconscious) reaction(s) by a speaker in an attempt to adapt his/her voice to account for the background noise conditions (i.e. the secondary impact of the background noise), and example(s) of corresponding actions that may be invoked as part of the speech naturalization process (e.g. in the speech naturalizer 505) in order to compensate for the secondary impact of the background noise.

signal v(n) as an input and provides the modified voice signal $\tilde{v}(n)$ as an output. In general, the speech enhancer 650 is arranged to operate in a manner described for the speech enhancer 250, such that the input voice characteristics $C_i$, comprise input voice loudness $L_c$, the reference voice characteristics $R_i$ comprise reference voice loudness $L_r$, and the modified voice characteristics $\tilde{C}_i$ comprise modified voice loudness $\tilde{L}_c$. Moreover, the noise characteristics $N_i$ comprise the noise loudness $L_n$.

The speech enhancer 650 comprises a reference voice loudness detector 602 for detection of the reference voice loudness $L_r$, an input voice loudness detector 604 for detection of the input voice loudness $L_c$ and a speech loudness naturalizer 605 for creating the modified speech signal $\tilde{v}(n)$. The speech enhancer 650 may comprise further processing portions or processing blocks, such as a noise loudness detector 601 for detection of the noise loudness $L_n$. Hence, the reference voice loudness detector 602 operates as the reference voice detector 502, the input voice loudness detector 604 operates as the input voice detector 504, the speech loudness naturalizer 605 operates as the speech naturalizer 505, and the noise loudness detector 601 operates as the noise detector 501.

The input voice loudness detector 604 is arranged to detect the input voice loudness for the frame $v_t(n)$, denoted as $L_{t,c}$ on basis of the noise-suppressed voice signal v(n). The input voice loudness detector 604 may be arranged to carry out an analysis of a segment/period of the noise-suppressed voice signal v(n) covering one or more frames representing active speech in order to detect the input voice loudness $L_{t,c}$. As an example, the input voice loudness $L_{t,c}$ may be detected on basis of the frame $v_t(n)$ only. As another example, the input voice loudness $L_{t,c}$ may be detected on basis of the frame $v_t(n)$ and further on basis of a predetermined number of frames preceding the frame $v_t(n)$ (e.g. frames $v_{t-k1}(n), \ldots v_{t-1}(n)$) and/or a predetermined number of frames following the frame $v_t(n)$ (e.g. frames $v_{t+1}(n), \ldots, v_{t+k2}(n)$). As an example, the detection of the

TABLE 1

| Speech characteristic type | Speaker action in background noise to make speech heard better | An exemplifying action to be taken in speech naturalization in response to detected speaker action |
|---|---|---|
| Voice loudness | Increase speech loudness during high background noise. | Decrease speech loudness during high background noise (when the increase of loudness is due to the speaker). |
| Pace/rhythm of speech | Pause occasionally during loud background noise and increase speaking pace during low (or no) background noise. | Sustain fluent pace of speech. This may require some buffering of speech and may be applicable foremost for non-delay-critical applications such as voice recording. |
| Spectral | Emphasize the frequencies in voice that coincide with peaks in the spectrum of background noise (and which may therefore become masked by noise) by e.g. subtle changes in the shape of the vocal tract or/and air pressure while still keeping sounds and speech intelligible. | De-emphasize frequencies in voice that coincide with peaks in the spectrum of background noise. |
| Intonation, e.g. pitch variation and stress | Make speech more audible in background noise e.g. by changing the pitch of voice to differ substantially from the fundamental frequency of background noise. | Make voice to sound more natural i.e. aligned with typical characteristics of human speech or of the particular speaker. |

Figure 6:
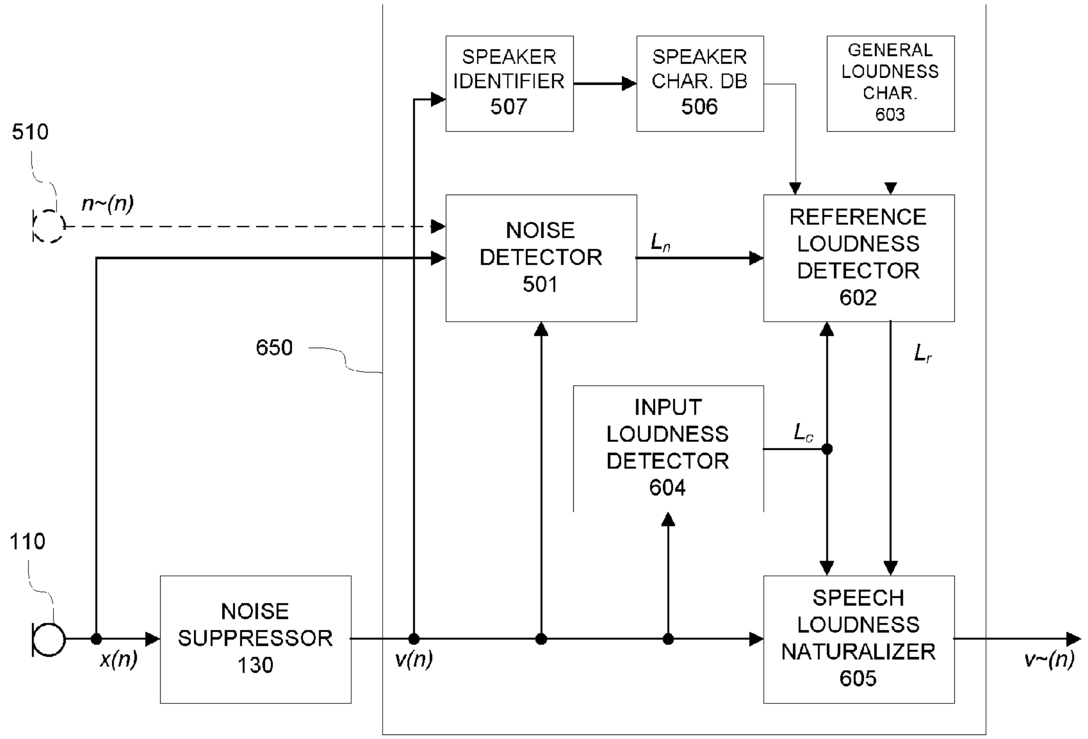
FIG. 6 schematically illustrates some components of a speech enhancer according to an example embodiment.

FIG. 6 schematically illustrates some components of the speech enhancer 650 in form of a block diagram. As in the example of FIG. 4 illustrating the speech enhancer 250, also the speech enhancer 650 receives the noise-suppressed voice input voice loudness $L_{t,c}$ may be carried out for a signal segment covering 500 to 3000 ms of the noise-suppressed voice signal v(n) and the analysis may be carried out for frames having duration in the range from 20 to 500 ms.

The reference voice loudness detector 602 is arranged to obtain the reference voice loudness for the frame $v_t(n)$, denoted as $L_{t,r}$, preferably descriptive of the loudness of the voice signal $\tilde{v}(n)$ in a noise-free environment or in a low-noise environment. The reference voice detector 602 may be arranged to obtain the noise indication $L_{t,n}$ from the noise detector 601, the noise indication $L_{t,n}$ being descriptive of the estimated noise level in the frame $x_t(n)$ or providing an indication whether the frame $x_t(n)$ is a noisy frame or a clean frame (as described in context of the reference voice detector 502). The process of obtaining the reference voice loudness $L_{t,r}$ on basis of the input voice loudness $L_{t,c}$ or on basis of the reference voice loudness $L_{t-1,r}$ obtained for the previous frame $v_{t-1}(n)$ may be carried out in a manner similar to that described in general case of obtaining the reference voice characteristics $R_{t,i}$ in context of the reference voice detector 502.

The speech loudness naturalizer 605 is arranged to evaluate whether the difference between the input voice loudness $L_{t,c}$ and the reference voice loudness $L_{t,r}$ meets the predetermined criteria. This may comprise determining respective loudness comparison value(s) indicative of the difference between the input voice loudness $L_{t,c}$ and the reference voice loudness $L_{t,r}$ and determining whether the indicated difference in loudness exceeds a respective predetermined threshold. As an example the comparison value may be determined as the loudness difference $L_{t,diff}$ between the input voice loudness $L_{t,c}$ and the reference voice loudness $L_{t,r}$, i.e. as $L_{t,diff}=L_{t,c}-L_{t,r}$, or as the loudness ratio $L_{t,ratio}$ between the input voice loudness $L_{t,c}$ and the reference voice loudness $L_{t,r}$, i.e. as $L_{t,ratio}=L_{t,c}/L_{t,r}$. Consequently, the modification of the frame $v_t(n)$ may be applied to create the respective modified voice frame $\tilde{v}_t(n)$ e.g. in response to the loudness difference $L_{t,diff}$ exceeding the (first) loudness threshold, whereas the loudness difference $L_{t,diff}$ that is smaller than or equal to the (first) loudness threshold results in applying a copy of frame $v_t(n)$ as the modified voice frame $\tilde{v}_t(n)$. As another example, the modification of the frame $v_t(n)$ may be applied to create the respective modified voice frame $\tilde{v}_t(n)$ e.g. in response to the loudness ratio $L_{t,ratio}$ exceeding a (second) loudness threshold or falling below a (third) loudness threshold, whereas the loudness ratio $L_{t,ratio}$ that is between these (second and third) thresholds results in applying a copy of frame $v_t(n)$ as the modified voice frame $\tilde{v}_t(n)$ The modification of the frame $v_t(n)$ in order to create the frame $\tilde{v}_t(n)$ may comprise modifying the frame $v_t(n)$ by multiplying the signal samples of the frame $v_t(n)$ by a scaling factor k, i.e. $\tilde{v}_t(n)=k*v_t(n)$, the scaling factor k determined e.g. as the ratio between the reference voice loudness $L_{t,r}$ to the input voice loudness $L_{t,c}$, e.g. $k=L_{t,c}/L_{t,c}$.

Figure 7A:
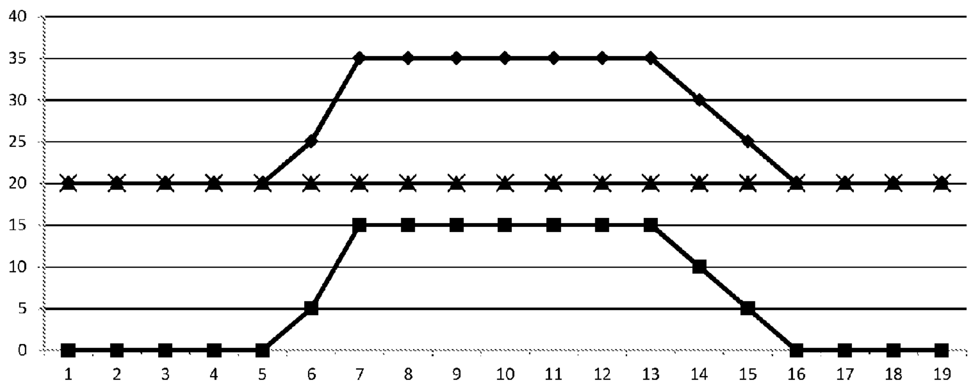
FIGS. 7*a* to 7*c* illustrate detection of input voice characteristics and the reference voice characteristics as a function of time according to an example embodiment.
Figure 7B:
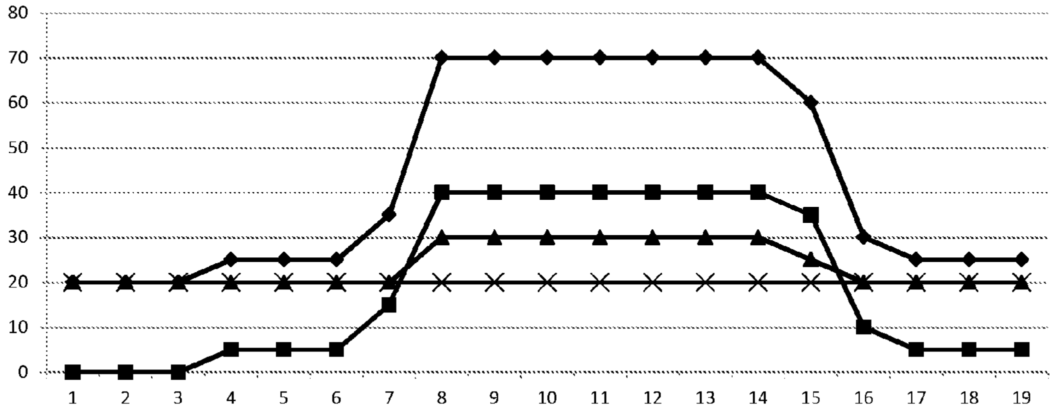
Figure 7C:
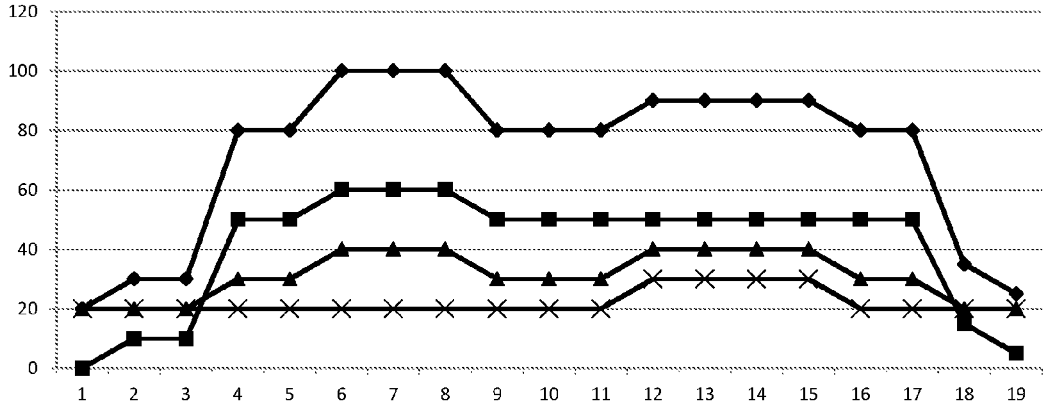

FIGS. 7a to 7c illustrate the detection of input voice characteristics and the reference voice characteristics as a function of time by using the loudness as an example of the voice characteristics. In each of FIGS. 7a to 7c, loudness of four signals are illustrated: the curve identified with diamond-shaped markers represents the loudness of the captured audio signal x(n), the curve identified with square-shaped markers represents the noise loudness $L_n$, the curve identified with triangle-shaped markers represents the input voice loudness $L_c$, and the curve identified with cross-shaped markers represents the reference voice loudness $L_r$. This conceptual example, however, generalizes to any voice characteristics. Moreover, although exemplified with one-dimensional (i.e. scalar) characteristic, but a multi-dimensional (e.g. vector) characteristic, such as a spectral magnitude, may be applied instead.

FIG. 7a illustrates a case without the secondary impact, where the input voice loudness $L_c$ has not been impacted by the background noise since the noise loudness $L_n$ stays low throughout the time period illustrated in the example of FIG. 7a. Consequently, the input voice loudness $L_c$ and the reference voice loudness $L_r$ remain the same or similar through the time period illustrated in FIG. 7a. Therefore, no modification of the noise-suppressed voice signal v(n) is required and the speech loudness naturalizer 605 (or the speech naturalizer 505) may provide the modified voice signal $\tilde{v}(n)$ as a copy of the noise-suppressed voice signal v(n).

FIG. 7b illustrates a case with the secondary impact, where the input voice loudness $L_c$ is impacted by the background noise during time instants 8 to 15. During these time instants the input voice loudness $L_c$ is different from the reference voice loudness $L_r$. Therefore, the reference voice loudness detector 602 (or the reference voice detector 502) may apply the reference voice loudness $L_r$ detected before the time period from time instant 8 to 15, e.g. the one detected for time instant 7 or earlier, instead of detecting the reference voice loudness $L_r$ based (at least in part) on frame of the noise-suppressed voice signal v(n) corresponding to the time instants from 8 to 15. Consequently, during time instants 8 to 15 the speech loudness naturalizer 605 (or the speech naturalizer 505) may apply the medication of the noise-suppressed voice signal v(n) to derive the respective frames of the modified voice signal $\tilde{v}(n)$ (as described hereinbefore) in order to provide voice exhibiting or approximating the reference voice loudness $L_r$, thereby providing the modified voice signal $\tilde{v}(n)$ at loudness characteristics corresponding those detected before time instants 8 to 15.

FIG. 7c provides a condensed illustration of an exemplifying case with the secondary impact identifiable for time instants 4 to 17. There is a change in the input voice loudness $L_c$ for time instants 12 to 15, but this change is not coinciding with a respective change in the noise loudness $L_n$.

Therefore, the reference voice loudness detector 602 (or the reference voice detector 502) may not apply the reference voice loudness $L_r$ detected before the time period from time instant 4 to 17 for the time instants 12 to 15 but may apply detection of the reference voice loudness $L_r$ based (at least in part) on a segment of the noise-suppressed voice signal v(n) corresponding to the time instants from 12 to 15 to account for the change in input voice loudness $L_c$ when there was no corresponding change in the noise loudness $L_n$. To put it in other words, the increase in the input voice loudness $L_c$ during time instants 12 to 15 is preferably not removed by the speech loudness naturalizer 605 (or the speech naturalizer 505). On the other hand, the change in the input voice loudness $L_c$ during time instants 6 to 8 coincides with a change in the noise loudness $L_n$, thereby representing a change in the input voice loudness $L_c$ that is preferably to be compensated for by the reference voice loudness detector 602 (or the reference voice detector 502). Hence, in the example of FIG. 7c, the resulting modified voice signal $\tilde{v}(n)$ should exhibit approximately constant (or flat) loudness except during the time instants 12 to 15. In this regard, the reference voice loudness detector 602 (or the reference voice detector 502) may apply the scaling factor k having value (approx.) k=0.5 for time instants 6 to 8, k=0.75 for time instants 12 to 15 and k=0.66 otherwise during time instants 4 to 17. Before time instant 4 and after time instant 17 (of the time period illustrated in the example of FIG. 7*c*) the scaling factor may have value k=1 (i.e. no modification of the noise-suppressed voice signal v(n) to create the corresponding period/frame of the modified voice signal $\tilde{v}(n)$).

Figure 10:
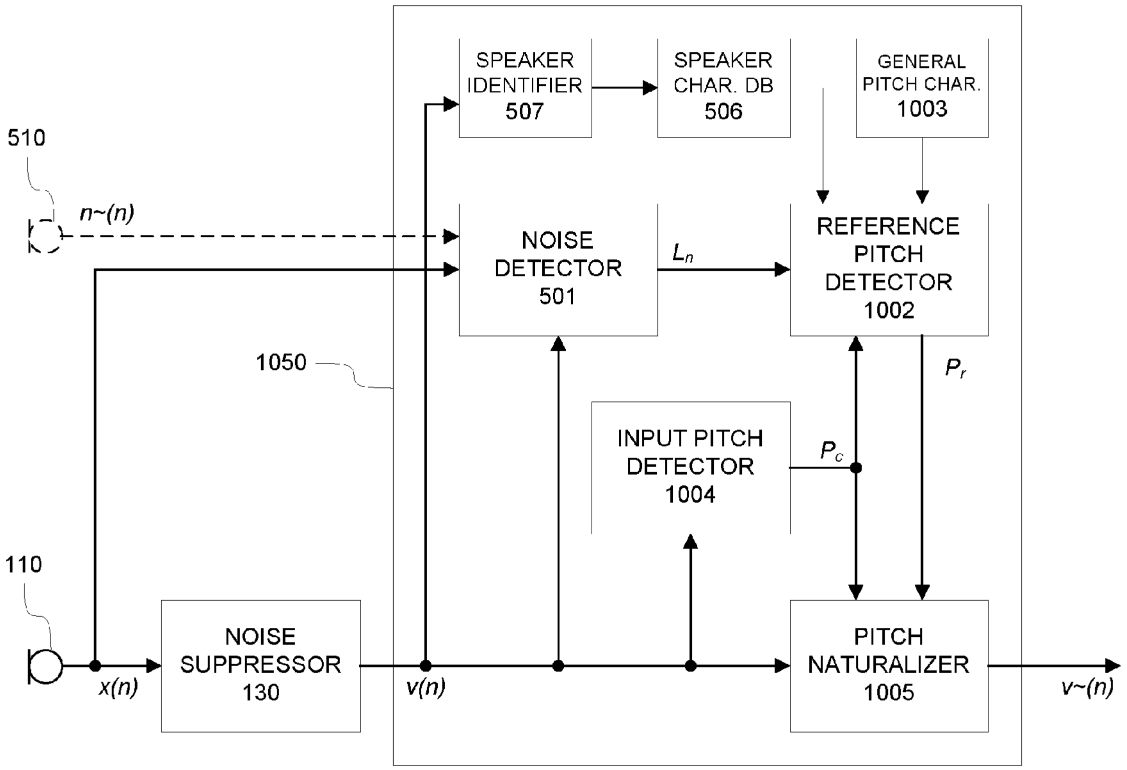
FIG. 10 schematically illustrates some components of a speech enhancer according to an example embodiment.

FIG. 10 schematically illustrates some components of the speech enhancer 1050 in form of a block diagram. As in the example of FIG. 4 illustrating the speech enhancer 250, also the speech enhancer 1050 receives the noise-suppressed voice signal v(n) as an input and provides the modified voice signal $\tilde{v}(n)$ as an output. In general, the speech enhancer 1050 is arranged to operate in a manner described for the speech enhancer 250, such that the input voice characteristics $C_i$, comprise pitch $P_c$ of the input voice, the reference voice characteristics $R_i$ comprise reference pitch $P_r$, and the modified voice characteristics $\tilde{C}_i$ comprise modified pitch $\tilde{P}_c$.

The speech enhancer 1050 comprises a reference pitch detector 1002 for detection of the reference pitch $P_r$, an input pitch detector 1004 for detection of the pitch $P_c$ of the input voice and a pitch naturalizer 1005 for creating the modified speech signal $\tilde{v}(n)$. The speech enhancer 1050 may comprise further processing portions or processing blocks, such as the noise detector 501 for detection of the noise characteristics $N_i$, e.g. the noise loudness $L_n$. Hence, the reference pitch detector 1002 operates as the reference voice detector 502, the input pitch detector 1004 operates as the input voice detector 504, and the pitch naturalizer 1005 operates as the speech naturalizer 505.

The input pitch detector 1004 is arranged to detect the pitch $P_c$ of the input voice for the frame $v_t(n)$, denoted as $P_{t,c}$ on basis of the noise-suppressed voice signal v(n). The input pitch detector 1004 may be arranged to carry out an analysis of a segment/period of the noise-suppressed voice signal v(n) covering one or more frames representing active speech in order to detect the input pitch $P_{t,c}$. As an example, the input pitch $P_{t,c}$ may be detected on basis of the frame $v_t(n)$ only. As another example, the input pitch $P_{t,c}$ may be detected on basis of the frame $v_t(n)$ and further on basis of a predetermined number of frames preceding the frame $v_t(n)$ (e.g. frames $v_{t-k1}(n), \ldots v_{t-1}(n)$) and/or a predetermined number of frames following the frame $v_t(n)$ (e.g. frames $v_{t+1}(n), \ldots, v_{t+k2}(n)$). As an example, the detection of the input pitch $P_{t,c}$ may be carried out for a signal segment covering 500 to 3000 ms of the noise-suppressed voice signal v(n) and the analysis may be carried out for frames having duration in the range from 20 to 500 ms.

The reference pitch detector 1002 is arranged to obtain the reference pitch for the frame $v_t(n)$, denoted as $P_{t,r}$, preferably descriptive of the pitch of the voice signal $\hat{v}(n)$ in a noise-free environment or in a low-noise environment. The reference pitch detector 1002 may be arranged to obtain the noise indication $L_{t,n}$ from the noise detector 501, the noise indication $L_{t,n}$ being descriptive of the estimated noise level in the frame $x_t(n)$ or providing an indication whether the frame $x_t(n)$ is a noisy frame or a clean frame (as described in context of the reference voice detector 502). The process of obtaining the reference pitch $P_{t,r}$ on basis of the input pitch $P_{t,c}$ or on basis of the reference pitch $P_{t-1,r}$ obtained for the previous frame $v_{t-1}(n)$ may be carried out in a manner similar to that described in general case of obtaining the reference voice characteristics $R_{t,i}$ in context of the reference voice detector 502.

The pitch naturalizer 1005 is arranged to evaluate whether the difference between the input pitch $P_{t,c}$ and the reference pitch $P_{t,r}$ meets the predetermined criteria. This may comprise determining respective pitch comparison value(s) indicative of the difference between the input pitch $P_{t,c}$ and the reference pitch $P_{t,r}$ and determining whether the indicated difference in pitch exceeds a respective predetermined threshold. As an example the comparison value may be determined as the pitch difference $P_{t,diff}$ between the input pitch $P_{t,c}$ and the reference pitch $P_{t,r}$, i.e. as $P_{t,diff}=P_{t,c}-P_{t,r}$, or as the pitch ratio $P_{t,ratio}$ between the input pitch $P_{t,c}$ and the reference pitch $P_{t,r}$, i.e. as $P_{t,ratio}=P_{t,c}/P_{t,r}$. Consequently, the modification of the frame $v_t(n)$ may be applied to create the respective modified voice frame $\tilde{v}_t(n)$ e.g. in response to the pitch difference $P_{t,diff}$ exceeding the (first) pitch difference threshold, whereas the pitch difference $P_{t,diff}$ that is smaller than or equal to the (first) pitch difference threshold results in applying a copy of frame $v_t(n)$ as the modified voice frame $\tilde{v}_t(n)$. As another example, the modification of the frame $v_t(n)$ may be applied to create the respective modified voice frame $\tilde{v}_t(n)$ e.g. in response to the pitch ratio $P_{t,ratio}$ exceeding a (second) pitch difference threshold or falling below a (third) pitch difference threshold, whereas the pitch ratio $P_{t,ratio}$ that is between these (second and third) pitch difference thresholds results in applying a copy of frame $v_t(n)$ as the modified voice frame $\tilde{v}_t(n)$ The modification of the frame $v_t(n)$ in order to create the frame $\tilde{v}_t(n)$ may comprise modifying the frame $v_t(n)$ by applying a pitch modification technique known in the art.

Figure 11:
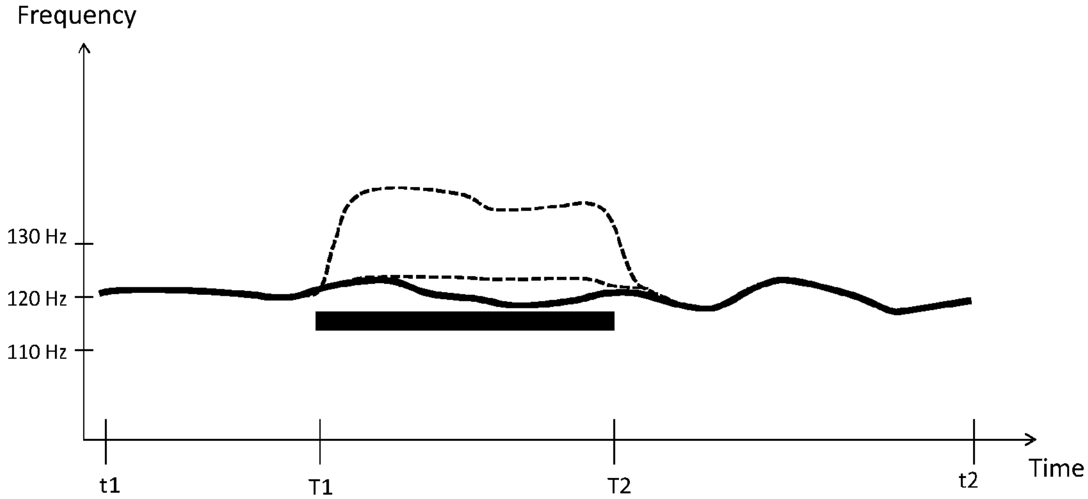
FIG. 11 provides a conceptual illustration of some aspects of time-domain impact in accordance with some example embodiments.

FIG. 11 shows a conceptual illustration of the impact of background noise to the pitch of speech/voice signal. The thin solid line indicates the average pitch during a sentence of speech (extending from the time instant t1 until the time instant t2) uttered by a male speaker in a noise-free or low-noise environment. The upper dashed line indicates the pitch when a loud background noise occurs around the speaker from time instant T1 to T2, i.e. during part of the uttered sentence. The lower dashed line shows the pitch trajectory after the pitch naturalization process. The fundamental frequency of the background noise is about 115 Hz as illustrated by the thick line. Hence, although the speaker reacts to the background noise involving a noise component having a pitch of about 115 Hz by changing the way he speaks, resulting in the pitch in the noise-suppressed voice signal v(n) increasing from approximately 120 Hz to approximately 140 Hz, the pitch naturalization compensates this change by modifying the pitch for the modified voice signal $\tilde{v}(n)$ to approximate the original pitch at/around approximately 120 Hz.

As briefly referred to hereinbefore (e.g. in context of the example of FIG. 7*c*) with a reference to the voice loudness, in a scenario where the input voice characteristics $C_i$ indicate change although there is no temporally coinciding change in the noise characteristics $N_i$, it may be advantageous to (re)detect the reference voice characteristics $R_i$ based on a signal segment covering one or more frames of the noise-suppressed voice signal v(n) of the changed input voice characteristics $C_i$ to account for the change. In other words, the reference voice detector 502 (e.g. the reference voice loudness detector 602) may be configured to consider the input voice characteristics $C_{t,i}$ applicable as the reference voice characteristics $R_{t,i}$ in response to the frame $x_t(n)$ being indicated as a noise frame in case the input voice characteristics $C_{t,i}$ exhibit a change exceeding a predetermined threshold in comparison to the input voice characteristics detected for a reference frame (denoted as $C_{ref,i}$) without a corresponding change in the noise characteristics $N_{t,i}$. The reference frame may be, for example, the frame immediately preceding the frame t. As another example, the reference frame may be the most recent frame from which the input voice characteristics $C_{t,i}$ were adopted as the reference voice characteristics $R_{t,i}$.

Figure 8A:
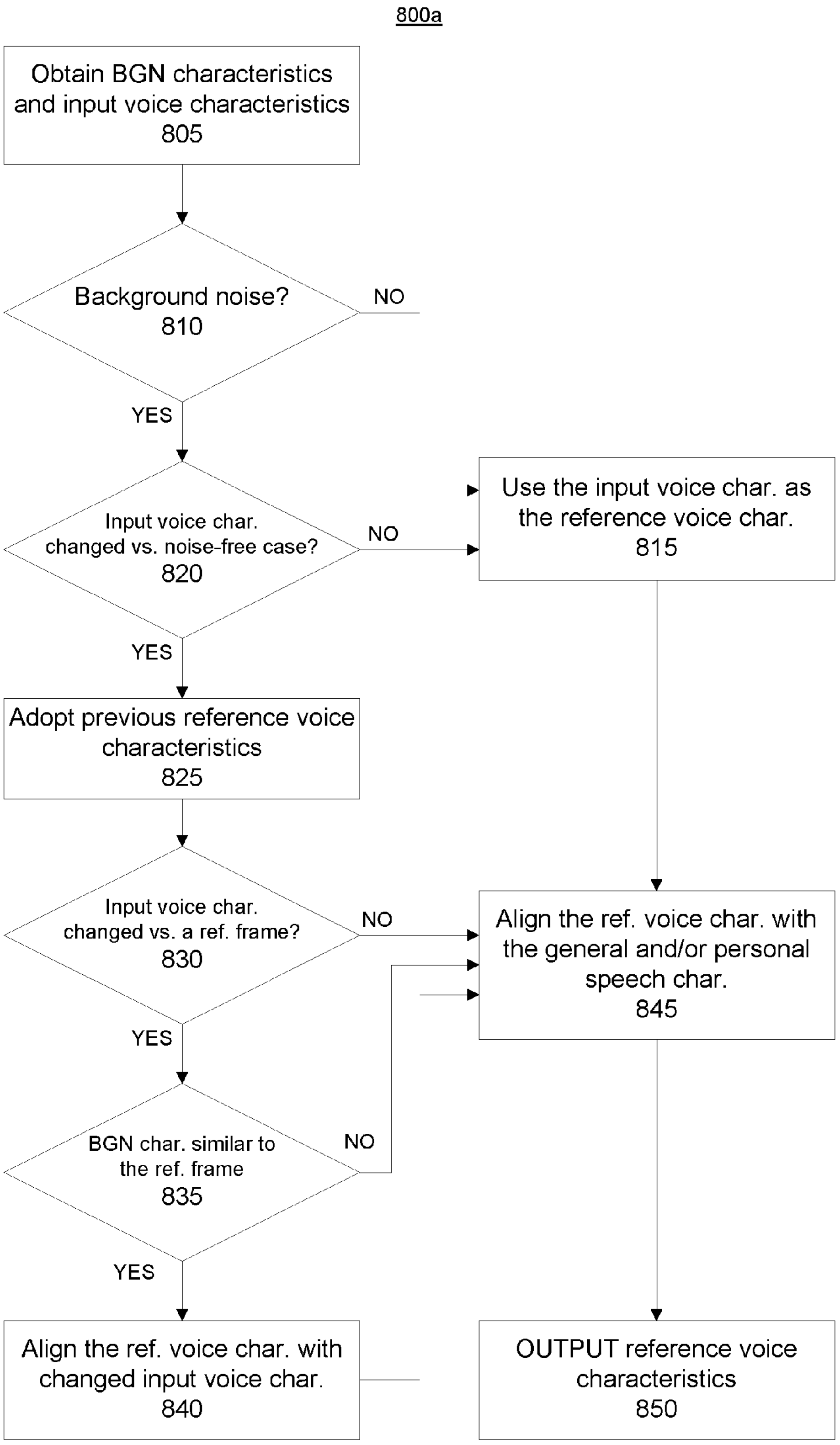
FIGS. 8*a* to 8*c* illustrate methods according to example embodiments.

FIG. 8*a* illustrates a flowchart describing a method 800*a* for obtaining (or adapting) the reference voice characteristics $R_{t,i}$. The method 800*a* may be implemented e.g. by the reference voice detector 502 or the reference voice loudness detector 602. In block 805, the respective voice characteristics are obtained, e.g. the noise characteristics $N_{t,i}$ and the input voice characteristics $C_{t,i}$. In block 810, it is determined whether the noise characteristics $N_{t,i}$ indicate noise-free or low-noise conditions. In response to the noise characteristics $N_{t,i}$ indicating noise-free or low-noise conditions, e.g. a noise loudness (or noise level) below the noise threshold, the input voice characteristics $C_{t,i}$ are applied as the (new) reference voice characteristics $R_{t,i}$ (block 815). In contrast, in case the noise characteristics $N_{t,i}$ indicating presence of a substantial background noise component, e.g. noise loudness (or noise level) that is larger than or equal to a predetermined noise threshold, the method 800*a* proceeds to block 820.

From block 815 the method 800*a* proceeds to block 845 for the optional step of aligning, at least in part, the reference voice characteristics $R_{t,i}$ with general properties of speech signals in a noise-free environment or in a low-noise environment and/or with personal characteristics of speech uttered by the speaker of the voice signal $\hat{v}(n)$. From block 845 the method 800*a* proceeds to block 850 for outputting the reference voice characteristics $R_{t,i}$ e.g. for being applied for the current frame and for being stored (in a memory) for further use in subsequent frame(s).

In block 820 it is determined whether the input voice characteristics $C_{t,i}$ are similar or essentially similar to those (most recently) detected in noise-free or low-noise conditions, denoted as noise-free voice characteristics $C_{nf,i}$. In response to this determination being affirmative, the input voice characteristics $C_{t,i}$ are applied as the (adapted) reference voice characteristics $R_{t,i}$ (block 815). In contrast, in response to the input voice characteristics $C_{t,i}$ being found to be different from the noise-free voice characteristics $C_{nf,i}$, the method 800*a* proceeds to obtaining the most recently applied reference voice characteristics $R_{t-1,i}$ (e.g. by reading from a memory) and (re)applying these as the (new) reference voice characteristics $R_{t,i}$, as indicated in block 825. The determination of similarity may comprise deriving the difference between the input voice characteristics $C_{t,i}$ and the noise-free voice characteristics $C_{nf,i}$, and considering the two being different in response to (the absolute value of) the difference therebetween exceeding a predetermined threshold. The threshold may be set differently for different voice characteristics i.

In block 830 it is determined whether the input voice characteristics $C_{t,i}$ are similar or essentially similar to those obtained for the reference frame $C_{ref,i}$. In response to this determination being affirmative, the method 800*a* proceeds to the (optional) block 845 and further to block 850. In contrast, in response to the input voice characteristics $C_{t,i}$ being found to be different from those of the reference frame $C_{ref,i}$, the method 800*a* proceeds to block 835. The determination of similarity may comprise deriving the difference between the input voice characteristics $C_{t,i}$ and the voice characteristics of the reference frame $C_{ref,i}$, and considering the two being different in response to (the absolute value of) the difference therebetween exceeding a predetermined threshold. The threshold may be set differently for different voice characteristics i.

In block 835 it is determined whether the noise characteristics $N_{t,i}$ are similar or essentially similar to noise characteristics obtained for the reference frame, denoted as $N_{ref,i}$. In response to this determination being affirmative, the method 800*a* proceeds to the (optional) block 845 and further to block 850. In contrast, in response to the noise characteristics $N_{t,i}$ being found to be different from the noise characteristics of the reference frame $N_{ref,i}$, the method 800*a* proceeds to block 840. The determination of similarity may comprise deriving the difference between the noise characteristics $N_{t,i}$ and noise characteristics of the reference frame $N_{ref,i}$, and considering the two being different in response to (the absolute value of) the difference therebetween exceeding a predetermined threshold. The threshold may be set differently for different voice characteristics i.

In block 840, the reference voice characteristics $R_{t,i}$ are modified to align them with the observed change in the input voice characteristics $C_{t,i}$ so that the change in the input voice characteristics $C_{t,i}$ (e.g. increase in loudness) causes a corresponding change (e.g. increase in loudness) in the reference voice characteristics $R_{t,i}$, as illustrated in FIG. 7*c* for time instants 12 to 15

In the following, exemplifying variations of the method 800*a* are described. Like the method 800*a*, also these variations thereof may be implemented e.g. by the reference voice detector 502 or the reference voice loudness detector 602.

Figure 8B:
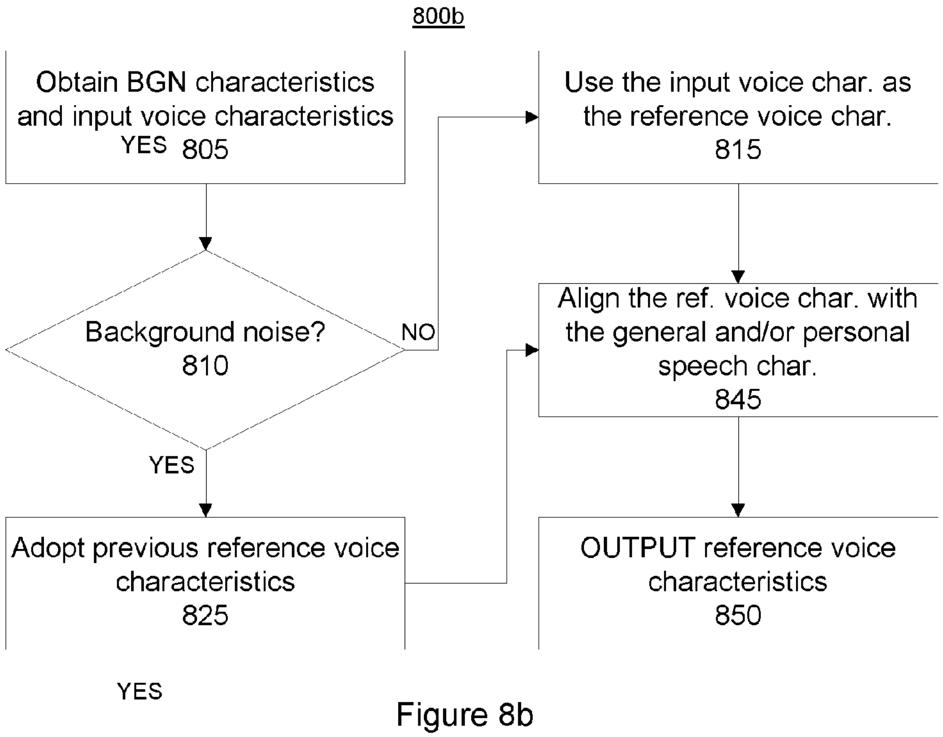

FIG. 8*b* illustrates a flowchart describing a method 800*b* for obtaining (or adapting) the reference voice characteristics $R_{t,i}$. In block 805, the respective voice characteristics are obtained, e.g. the noise characteristics $N_{t,i}$ and the input voice characteristics $C_{t,i}$. In block 810, it is determined whether the noise characteristics $N_{t,i}$ indicate noise-free or low-noise conditions. In response to the noise characteristics $N_{t,i}$ indicating noise-free or low-noise conditions, e.g. a noise loudness (or noise level) below the noise threshold, the input voice characteristics $C_{t,i}$ are applied as the (new) reference voice characteristics $R_{t,i}$ (block 815). In contrast, in case the noise characteristics $N_{t,i}$ indicating presence of a substantial background noise component, e.g. noise loudness (or noise level) that is larger than or equal to a predetermined noise threshold, the method 800*a* proceeds to block 825 to adopt the most recently applied reference voice characteristics $R_{t-1,i}$ (e.g. by reading from a memory) as the (new) reference voice characteristics $R_{t,i}$. From block 815 or from block 825 the method 800*b* proceeds to block 845 for the optional step of aligning the reference voice characteristics $R_{t,i}$ with general properties of speech signals in a noise-free environment or in a low-noise environment and/or with general properties of speech signals uttered by the speaker of the voice signal $\hat{v}(n)$ and further to block 850 for outputting the reference voice characteristics $R_{t,i}$.

Figure 8C:
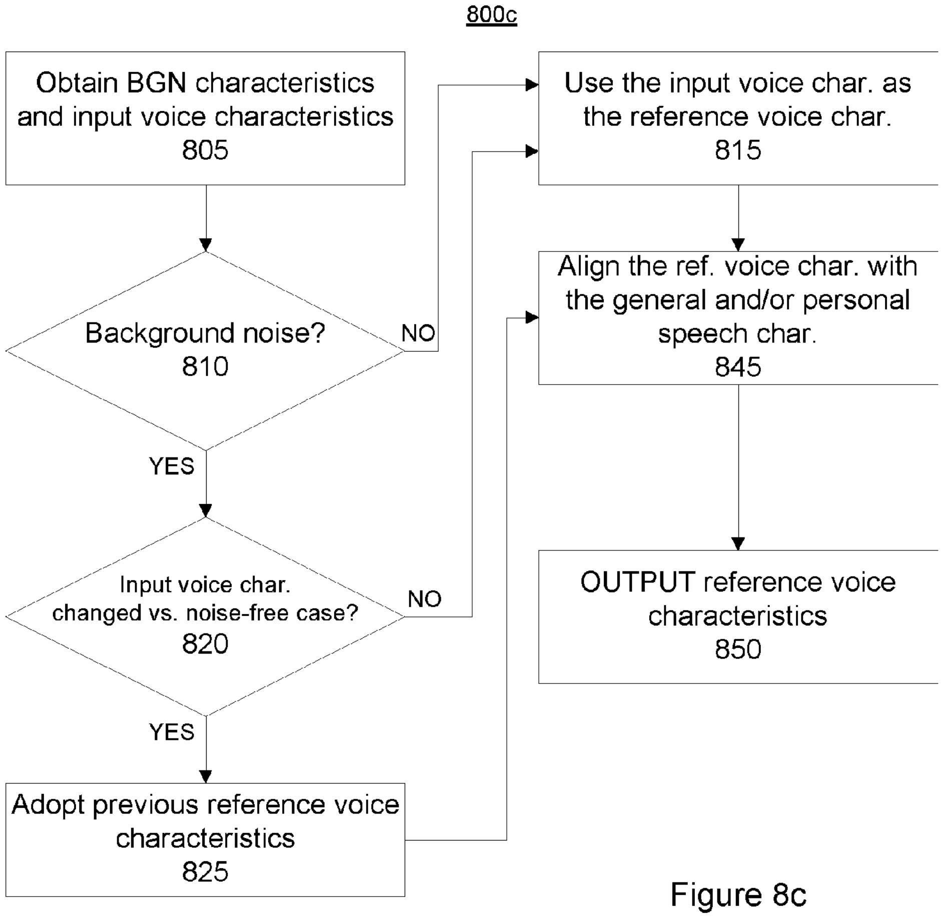

FIG. 8*c* illustrates a flowchart describing a method 800*c* for obtaining (or adapting) the reference voice characteristics $R_{t,i}$. In block 805, the respective voice characteristics are obtained, e.g. the noise characteristics $N_{t,i}$ and the input voice characteristics $C_{t,i}$. In block 810, it is determined whether the noise characteristics $N_{t,i}$ indicate noise-free or low-noise conditions. In response to the noise characteristics $N_{t,i}$ indicating noise-free or low-noise conditions, e.g. a noise loudness (or noise level) below the noise threshold, the input voice characteristics $C_{t,i}$ are applied as the (new) reference voice characteristics $R_{t,i}$ (block 815). In contrast, in case the noise characteristics $N_{t,i}$ indicating presence of a substantial background noise component, e.g. noise loudness (or noise level) that is larger than or equal to a predetermined noise threshold, the method 800*a* proceeds to block 820 to determine whether the input voice characteristics $C_{t,i}$ are similar or essentially similar to the voice characteristics $C_{nf,i}$ (most recently) detected in noise-free or low-noise conditions. In response to this determination being affirmative, the input voice characteristics $C_{t,i}$ are applied as the (adapted) reference voice characteristics $R_{t,i}$ (block 815). In contrast, in response to the input voice characteristics $C_{t,i}$ being found to be different from the noise-free voice characteristics $C_{nf,i}$, the method 800*c* proceeds to obtaining the most recently applied reference voice characteristics $R_{t-1,i}$ (e.g. by reading from a memory) and (re)applying these as the (new) reference voice characteristics $R_{t,i}$, as indicated in block 825. From block 815 or from block 825 the method 800*c* proceeds to block 845 for the optional step of aligning the reference voice characteristics $R_{t,i}$ with general properties of speech signals in a noise-free environment or in a low-noise environment and/or with general properties of speech signals uttered by the speaker of the voice signal $\tilde{v}(n)$ and further to block 850 for outputting the reference voice characteristics $R_{t,i}$.

The operations, procedures, functions and/or methods described in context of the components of the speech enhancer 250, 650, 1050 may be distributed between the components in a manner different from the one(s) described hereinbefore. There may be, for example, further components within the speech enhancer 250, 650, 1050 for carrying out some of the operations procedures, functions and/or methods assigned in the description hereinbefore to components of the respective speech enhancer 250, 650, 1050, or there may be a single component or a unit for carrying out the operations, procedures, functions and/or methods described in context of the speech enhancer 250, 650, 1050.

In particular, the operations, procedures, functions and/or methods described in context of the components of the speech enhancer 250, 650, 1050 may be provided as software means, as hardware means, or as a combination of software means and hardware means. As an example in this regard, the speech enhancer 250 may be provided as an apparatus comprising means for means for obtaining a current time frame of a noise-suppressed voice signal, derived on basis of a current time frame of a source audio signal comprising a source voice signal, means for detecting input voice characteristics $C_i$ for the current time frame of noise-suppressed voice signal, means for obtaining reference voice characteristics $R_i$ for said current time frame, said reference voice characteristics $R_i$ being descriptive of the source voice signal in noise-free or low-noise environment, and means for creating a current time frame of a modified voice signal $\tilde{v}(n)$ by modifying said current time frame of the noise-suppressed voice signal in response to a difference between the detected input voice characteristics $C_i$ and the reference voice characteristics $R_i$ exceeding a predetermined threshold.

Along similar lines, the speech enhancer 650 may be provided as an apparatus comprising means for obtaining a current time frame of a noise-suppressed voice signal v(n), derived on basis of a current time frame of a source audio signal comprising a source voice signal, means for detecting input voice loudness $L_c$ for the current time frame of noise-suppressed voice signal v(n), means for obtaining reference voice loudness $L_r$ for said current time frame, said reference voice loudness $L_r$ being descriptive of the source voice signal in noise-free or low-noise environment, and means for creating a current time frame of a modified voice signal $\tilde{v}(n)$ by modifying said current time frame of the noise-suppressed voice signal v(n) in response to a difference between the detected input voice loudness $L_c$ and the reference voice loudness $L_r$ exceeding a predetermined threshold. As a further example, the speech enhancer 1050 may be provided as an apparatus comprising means for obtaining a current time frame of a noise-suppressed voice signal v(n), derived on basis of a current time frame of a source audio signal comprising a source voice signal, means for detecting a pitch $P_c$, of the input voice for the current time frame of noise-suppressed voice signal v(n), means for obtaining a reference pitch $P_r$, for said current time frame, said reference pitch $P_r$, being descriptive of the source voice signal in noise-free or low-noise environment, and means for creating a current time frame of a modified voice signal $\tilde{v}(n)$ by modifying said current time frame of the noise-suppressed voice signal v(n) in response to a difference between the input pitch $P_c$, and the reference pitch $P_r$, exceeding a predetermined threshold.

Figure 9:
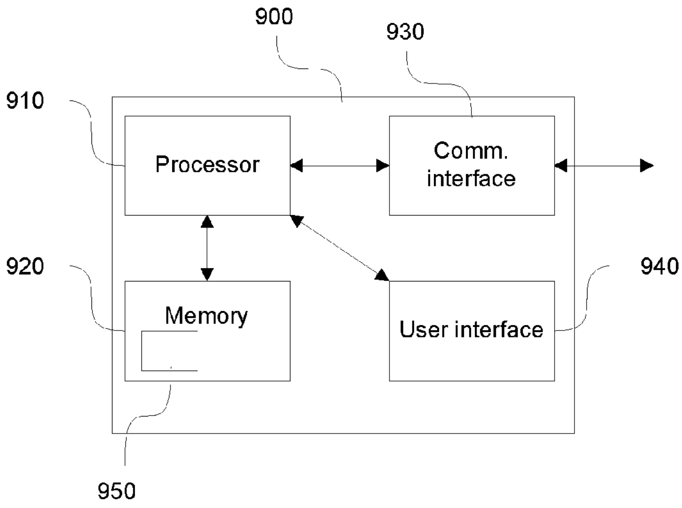
FIG. 9 schematically illustrates an exemplifying apparatus according to an example embodiment.

FIG. 9 schematically illustrates an exemplifying apparatus 900 upon which an embodiment of the invention may be implemented. The apparatus 900 as illustrated in FIG. 9 provides a diagram of exemplary components of an apparatus, which is capable of operating as or providing the speech enhancer 250, 650, 1050 according to an embodiment. The apparatus 900 comprises a processor 910 and a memory 920. The processor 910 is configured to read from and write to the memory 920. The memory 920 may, for example, act as the memory for storing the audio/voice signals and the noise/voice characteristics. The apparatus 900 may further comprise a communication interface 930, such as a network card or a network adapter enabling wireless or wireline communication with another apparatus and/or radio transceiver enabling wireless communication with another apparatus over radio frequencies. The apparatus 900 may further comprise a user interface 940 for providing data, commands and/or other input to the processor 910 and/or for receiving data or other output from the processor 910, the user interface 940 comprising for example one or more of a display, a keyboard or keys, a mouse or a respective pointing device, a touchscreen, a touchpad, etc. The apparatus 900 may comprise further components not illustrated in the example of FIG. 9.

Although the processor 910 is presented in the example of FIG. 9 as a single component, the processor 910 may be implemented as one or more separate components. Although the memory 920 in the example of FIG. 9 is illustrated as a single component, the memory 920 may be implemented as one or more separate components, some or all of which may be integrated/removable and/or may provide permanent/semi-permanent/dynamic/cached storage.

The apparatus 900 may be embodied for example as a mobile phone, a smartphone, a digital camera, a digital video camera, a music player, a media player, a gaming device, a laptop computer, a desktop computer, a personal digital assistant (PDA), a tablet computer, etc.

The memory 920 may store a computer program 950 comprising computer-executable instructions that control the operation of the apparatus 900 when loaded into the processor 910. As an example, the computer program 950 may include one or more sequences of one or more instructions. The computer program 950 may be provided as a computer program code. The processor 910 is able to load and execute the computer program 950 by reading the one or more sequences of one or more instructions included therein from the memory 920. The one or more sequences of one or more instructions may be configured to, when executed by one or more processors, cause an apparatus, for example the apparatus 900, to carry out the operations, procedures and/or functions described hereinbefore in context of the speech enhancer 250, 650, 1050.

Hence, the apparatus 900 may comprise at least one processor 910 and at least one memory 920 including computer program code for one or more programs, the at least one memory 920 and the computer program code configured to, with the at least one processor 910, cause the apparatus 900 to perform the operations, procedures and/or functions described hereinbefore in context of the speech enhancer 250, 650, 1050.

The computer program 950 may be provided at the apparatus 900 via any suitable delivery mechanism. As an example, the delivery mechanism may comprise at least one computer readable non-transitory medium having program code stored thereon, the program code which when executed by an apparatus cause the apparatus at least to carry out the operations, procedures and/or functions described hereinbefore in context of the speech enhancer 250, 650, 1050. The delivery mechanism may be for example a computer readable storage medium, a computer program product, a memory device a record medium such as a CD-ROM, a DVD, a Blue-Ray disc or another article of manufacture that tangibly embodies the computer program 950. As a further example, the delivery mechanism may be a signal configured to reliably transfer the computer program 950.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus comprising at least one processor and at least one non-transitory computer-readable memory including computer program code for one or more programs, the at least one non-transitory computer-readable memory and the computer program code configured to, with the at least one processor, cause the apparatus at least to:

obtain a current time frame of a noise-suppressed voice signal, derived on basis of a current time frame of a source audio signal comprising a source voice signal;

detect input voice characteristics for the current time frame of noise-suppressed voice signal;

obtain reference voice characteristics for said current time frame, said reference voice characteristics being descriptive of the source voice signal in noise-free or low-noise environment; and create a current time frame of a modified voice signal by modifying said current time frame of the noise-suppressed voice signal in response to a difference between the detected input voice characteristics and the reference voice characteristics exceeding a predetermined threshold.

2. An apparatus according to claim 1, wherein said apparatus caused to detect input voice characteristics is further caused to detect the input voice characteristics based at least in part on said current time frame of the noise-suppressed voice signal.

3. An apparatus according to claim 1, wherein said apparatus caused to detect input voice characteristics is further caused to detect the input characteristics based at least in part on one or more time frames of the noise-suppressed voice signal preceding said current time frame.

4. An apparatus according to claim 1, wherein said apparatus caused to obtain the reference voice characteristics is further caused to derive said reference voice characteristics on basis of the noise-suppressed voice signal captured in noise-free or low-noise environment.

5. An apparatus according to claim 1, wherein the apparatus caused to obtain the reference voice characteristics is further caused to:

apply said input voice characteristics detected for the current time frame as the reference voice characteristics in response to said input voice characteristics representing speech in noise-free or low-noise environment; and apply reference voice characteristics obtained for a first preceding time frame of the noise-suppressed voice signal in response to said input voice characteristics representing speech in noisy environment.

6. An apparatus according to claim 1, wherein said apparatus caused to obtain the reference voice characteristics is further caused to:

apply said input voice characteristics for the current time frame as the reference voice characteristics in response to at least one of;

said input voice characteristics for the current time frame representing speech in noise-free or low-noise environment, and said input voice characteristics for the current time frame being similar to input voice characteristics obtained for a second preceding time frame of the noise-suppressed voice signal, said second preceding time frame representing speech in noise-free or low-noise environment; and apply reference voice characteristics obtained for a first preceding time frame of the noise-suppressed voice signal in response to said input voice characteristics for the current time frame representing speech in noisy environment and said input voice characteristics for the current time frame being different from said input voice characteristics obtained for said second preceding time frame.

7. An apparatus according to claim 6, wherein said apparatus caused to apply reference voice characteristics obtained for the first preceding time frame is further caused to align said reference voice characteristics obtained for the first preceding frame in response to:

said input voice characteristics for the current time frame being different from said input voice characteristics obtained for said first preceding time frame; and noise characteristics for a current time frame of the source audio signal being similar to noise characteristics for a time frame of the source audio signal corresponding to said first preceding time frame, wherein said apparatus being caused to align is further caused to change the reference voice characteristics obtained for the first preceding time frame in accordance with the difference between said input voice characteristics for the current time frame and said input voice characteristics for said first preceding time frame.

8. An apparatus according to claim 6, wherein said second preceding time frame is a closest past frame to the current time frame that represents speech in noise-free or low-noise environment.

9. An apparatus according to claim 5, wherein said first preceding time frame is a time frame immediately preceding the current time frame.

10. An apparatus according to claim 5, wherein said apparatus caused to obtain the reference voice characteristics is further caused to adapt the input voice characteristics detected for the current time frame based at least in part on general properties of speech signals in noise-free or low-noise environment.

11. An apparatus according to claim 1, wherein said apparatus caused to obtain the reference voice characteristics is further caused to adapt the input voice characteristics detected for the current time frame based at least at least in part on general properties of speech signals uttered by a speaker of the source voice signal.

12. An apparatus according to claim 1, wherein said apparatus caused to create the current frame of modified voice signal is further caused to modify said current time frame of noise-suppressed voice signal to exhibit voice characteristics corresponding to said reference voice characteristics.

13. An apparatus according to claim 1, wherein said apparatus caused to create the current frame of modified voice signal is further caused to derive one or more comparison values descriptive of the difference between the detected input voice characteristic and the reference voice characteristics and comparing said one or more comparison values to respective one or more predetermined thresholds.

14. An apparatus according to claim 1, wherein said voice characteristics comprise a root mean squared value descriptive of voice loudness, and wherein said apparatus caused to creating the current frame of modified voice signal is further caused to:

derive a loudness difference between the voice loudness of the current time frame and the reference voice loudness; and scale in response to said loudness difference exceeding a loudness threshold, said current time frame by a scaling factor determined as a ratio between the reference voice loudness and the loudness of the current time frame.

15. An apparatus according to claim 1, wherein the voice characteristics comprise one or more of the following: one or more parameters descriptive of a spectral magnitude of the respective voice, one or more parameters descriptive of a spectral shape of the respective signal, one or more parameters descriptive of the pace or rhythm of the speech in the voice signal, one or more parameters descriptive of the pitch of voice of the speaker in the voice signal.

16. A method comprising:

obtaining a current time frame of a noise-suppressed voice signal, derived on basis of a current time frame of a source audio signal comprising a source voice signal;

detecting input voice characteristics for the current time frame of noise-suppressed voice signal;

obtaining reference voice characteristics for said current time frame, said reference voice characteristics being descriptive of the source voice signal in noise-free or low-noise environment; and creating a current time frame of a modified voice signal by modifying said current time frame of the noise-suppressed voice signal in response to a difference between the detected input voice characteristics and the reference voice characteristics exceeding a predetermined threshold.

17. A method according to claim 16, wherein said input voice characteristics are detected based at least in part on said current time frame of the noise-suppressed voice signal.

18. A method according to claim 16, wherein said input voice characteristics are detected based at least in part on one or more time frames of the noise-suppressed voice signal preceding said current time frame.

19. A method according to claim 16, wherein said reference voice characteristics are derived on basis of the noise-suppressed voice signal captured in noise-free or low-noise environment.

20. A method according to claim 16, wherein said obtaining the reference voice characteristics comprises:

applying said input voice characteristics detected for the current time frame as the reference voice characteristics in response to said input voice characteristics representing speech in noise-free or low-noise environment; and applying reference voice characteristics obtained for a first preceding time frame of the noise-suppressed voice signal in response to said input voice characteristics representing speech in noisy environment.

21. A method according to claim 16, wherein said obtaining the reference voice characteristics comprises:

applying said input voice characteristics for the current time frame as the reference voice characteristics in response to at least one of;

said input voice characteristics for the current time frame representing speech in noise-free or low-noise environment, and said input voice characteristics for the current time frame being similar to input voice characteristics obtained for a second preceding time frame of the noise-suppressed voice signal, said second preceding time frame representing speech in noise-free or low-noise environment; and applying reference voice characteristics obtained for a first preceding time frame of the noise-suppressed voice signal in response to said input voice characteristics for the current time frame representing speech in noisy environment and said input voice characteristics for the current time frame being different from said input voice characteristics obtained for said second preceding time frame.

22. A method according to claim 21, wherein said applying reference voice characteristics obtained for the first preceding time frame further comprises aligning said reference voice characteristics obtained for the first preceding frame in response to:

said input voice characteristics for the current time frame being different from said input voice characteristics obtained for said first preceding time frame; and noise characteristics for a current time frame of the source audio signal being similar to noise characteristics for a time frame of the source audio signal corresponding to said first preceding time frame, wherein said aligning comprises changing the reference voice characteristics obtained for the first preceding time frame in accordance with the difference between said input voice characteristics for the current time frame and said input voice characteristics for said first preceding time frame.

23. A method according to claim 21, wherein said second preceding time frame is a closest past frame to the current time frame that represents speech in noise-free or low-noise environment.

24. A method according to claim 20, wherein said first preceding time frame is a time frame immediately preceding the current time frame.

25. A method according to claim 20, wherein obtaining the reference voice characteristics comprises adapting the input voice characteristics detected for the current time frame based at least in part on general properties of speech signals in noise-free or low-noise environment.

* * * * *